(12) United States Patent
Huang et al.

(10) Patent No.: US 11,656,704 B2
(45) Date of Patent: May 23, 2023

(54) DRIVING CIRCUIT

(71) Applicant: AU Optronics Corporation, Hsin-Chu (TW)

(72) Inventors: Shu-Hao Huang, Hsin-Chu (TW); Sung-Yu Su, Hsin-Chu (TW)

(73) Assignee: AU OPTRONICS CORPORATION, Hsin-Chu (TW)

(*) Notice: Subject to any disclaimer, the term of this patent is extended or adjusted under 35 U.S.C. 154(b) by 0 days.

(21) Appl. No.: 17/511,610

(22) Filed: Oct. 27, 2021

(65) Prior Publication Data

US 2022/0391034 A1    Dec. 8, 2022

(30) Foreign Application Priority Data

Jun. 8, 2021    (TW) .................................. 110120830

(51) Int. Cl.
| | | |
|---|---|---|
| *G06F 3/041* | (2006.01) | |
| *G06F 3/044* | (2006.01) | |
| *G09G 3/20* | (2006.01) | |

(52) U.S. Cl.
CPC ............ *G06F 3/0412* (2013.01); *G06F 3/044* (2013.01); *G09G 3/2092* (2013.01); *G09G 2310/08* (2013.01)

(58) Field of Classification Search
CPC ..... G06F 3/0412; G06F 3/044; G09G 3/2092; G09G 2310/08
See application file for complete search history.

(56) References Cited

U.S. PATENT DOCUMENTS

| | | | |
|---|---|---|---|
| 10,209,802 B2 | 2/2019 | Li et al. | |
| 2014/0306867 A1* | 10/2014 | Qing ................... | G09G 3/3233 345/76 |
| 2015/0053947 A1* | 2/2015 | Qing ................... | G06F 3/0412 257/40 |
| 2015/0193045 A1* | 7/2015 | Zhou ................... | G09G 3/3233 345/174 |
| 2015/0221255 A1* | 8/2015 | Qing ................... | G06F 3/0412 345/212 |
| 2016/0204165 A1* | 7/2016 | Yang ................... | G09G 3/3225 345/174 |
| 2016/0246409 A1* | 8/2016 | Yang ................... | G09G 3/3233 |

(Continued)

FOREIGN PATENT DOCUMENTS

GN    107039002 A    8/2017

*Primary Examiner* — Hong Zhou
(74) *Attorney, Agent, or Firm* — WPAT, P.C

(57) ABSTRACT

A driving circuit includes a driving transistor, a capacitor, a reset circuit, a touch sensing electrode, a sensing circuit, and a read circuit. The capacitor is electrically coupled to a gate terminal of the driving transistor. The reset circuit is electrically coupled to the gate terminal of the driving transistor, and the reset circuit is configured to reset the voltage level of the gate terminal of the driving transistor. The sensing circuit is electrically coupled between the touch sensing electrode and the gate terminal of the driving transistor, and the sensing circuit is configured to transmit the voltage level of the touch sensing electrode to the gate terminal of the driving transistor. The read circuit is electrically coupled to the driving transistor, and the read circuit is configured to output a touch sensing signal according to the voltage level of the gate terminal of the driving transistor.

18 Claims, 19 Drawing Sheets

(56) References Cited

U.S. PATENT DOCUMENTS

| | | | |
|---|---|---|---|
| 2016/0365032 A1* | 12/2016 | Wu | G09G 3/3233 |
| 2017/0162121 A1* | 6/2017 | Yang | G06F 3/016 |
| 2017/0277335 A1* | 9/2017 | Zhu | H03K 17/962 |
| 2018/0082647 A1* | 3/2018 | Nie | G09G 3/3233 |
| 2018/0158876 A1* | 6/2018 | Shi | H01L 27/3276 |
| 2019/0129555 A1 | 5/2019 | Chiang | |
| 2019/0325189 A1 | 10/2019 | Sun et al. | |
| 2020/0105828 A1* | 4/2020 | Ryu | H01L 31/167 |
| 2021/0020108 A1* | 1/2021 | Chen | G09G 3/2092 |
| 2021/0263601 A1* | 8/2021 | Choi | G06F 3/0443 |

* cited by examiner

DRIVING CIRCUIT

CROSS-REFERENCE TO RELATED APPLICATION

This application claims priority to Taiwan Application Serial Number 110120830, filed Jun. 8, 2021, which is herein incorporated by reference in its entirety.

BACKGROUND

Field of Invention

The present invention relates to a driving circuit. More particularly, the present invention relates to a driving circuit with light emitting element and touch sensing function.

Description of Related Art

In today's technology, display panels with touch sensing functions are often composed of independent touch sensing circuits and pixel circuits. However, since some touch sensing elements (for example, optical touch sensing elements) are easily affected by ambient light and panel structure, their sensitivity is usually reduced in order to reduce the noise received during touch sensing, the display time of the display panel is usually reduced. Moreover, under such respective operating circuit architectures, additional independent touch sensing time must be divided, which will cause the charging rate of the touch sensing element and the resolution of the touch sensing function to be limited.

SUMMARY

The invention provides a driving circuit. The driving circuit comprises the driving transistor, the capacitor, the reset circuit, the touch sensing electrode, the sensing circuit, and the read circuit. The capacitor is electrically coupled to the gate terminal of the driving transistor. The reset circuit is electrically coupled to the gate terminal of the driving transistor, and configured to reset the electric potential of the gate terminal of the driving transistor. The sensing circuit is electrically coupled between the touch sensing electrode and the gate terminal of the driving transistor, the sensing circuit is configured to transmit the electric potential of the touch sensing electrode to the gate terminal of the driving transistor. The read circuit is electrically coupled to the driving transistor, and the read circuit is configured to output the touch sensing signal according to the electric potential of the gate terminal of the driving transistor.

In summary, the present disclosure uses the touch sensing electrode to sense the user's touch, and uses the sensing circuit to transmit the electric potential of the touch sensing electrode to the gate terminal of the driving transistor, then the read circuit outputs the touch sensing signal according to the electric potential of the gate terminal of the driving transistor, so that the driving transistor can integrate the touch sensing function and the function of the pixel driving transistor.

It is to be understood that both the foregoing general description and the following detailed description are by examples, and are intended to provide further explanation of the invention as claimed.

BRIEF DESCRIPTION OF THE DRAWINGS

The invention can be more fully understood by read the following detailed description of the embodiment, with reference made to the accompanying drawings as follows.

DETAILED DESCRIPTION

Figure 1A:
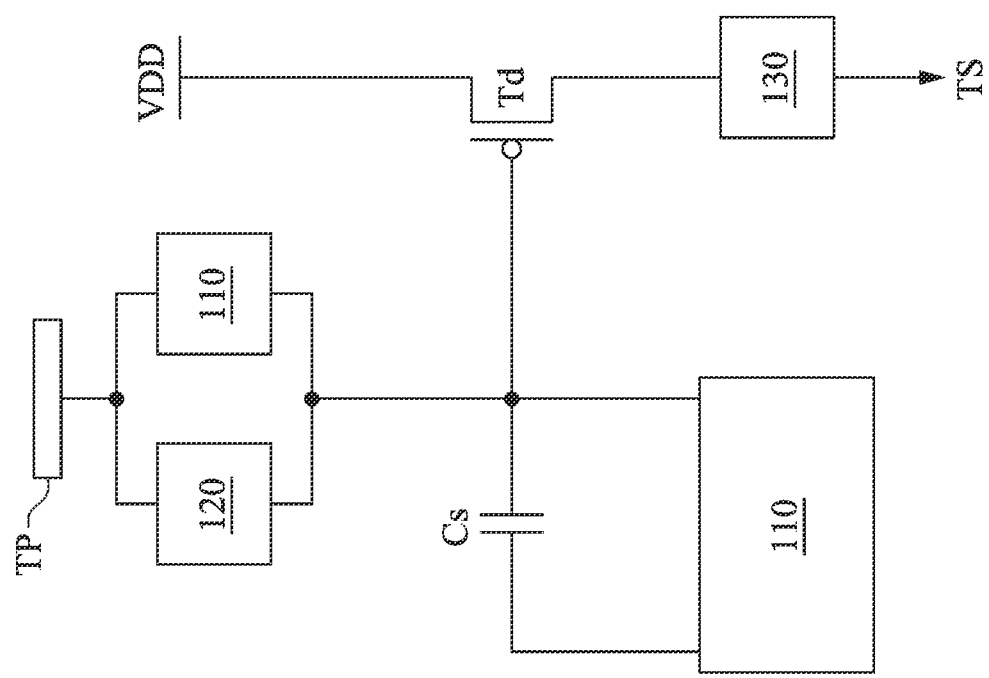
FIG. 1A shows a function block diagram of the driving circuit according to some embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1A shows a function block diagram of a driving circuit 100a according to some embodiment of the present disclosure. As shown in FIG. 1A, the driving circuit 100a includes a touch sensing electrode TP, a reset circuit 110, a sensing circuit 120, a read circuit 130, a capacitor Cs, and a driving transistor Td.

In terms of architecture, the capacitor Cs is electrically coupled to the gate terminal of the driving transistor Td. The reset circuit 110 is electrically coupled to the gate terminal of the driving transistor Td, the reset circuit 110 is used to reset the electric potential of the gate terminal of the driving transistor Td. The sensing circuit 120 is electrically coupled between the touch sensing electrode TP and the gate terminal of the driving transistor Td, the sensing circuit 120 is used to transmit the electric potential of the touch sensing electrode TP to the gate terminal of the driving transistor Td.

The driving transistor Td is electrically coupled between the first system voltage terminal VDD and the read circuit 130. The first terminal of the driving transistor Td is electrically coupled to the first system voltage terminal VDD. The read circuit 130 is electrically coupled to the second terminal of the driving transistor Td, and the read circuit 130 is used to output the touch sensing signal TS according to the electric potential of the gate terminal of the driving transistor Td.

Figure 1B:
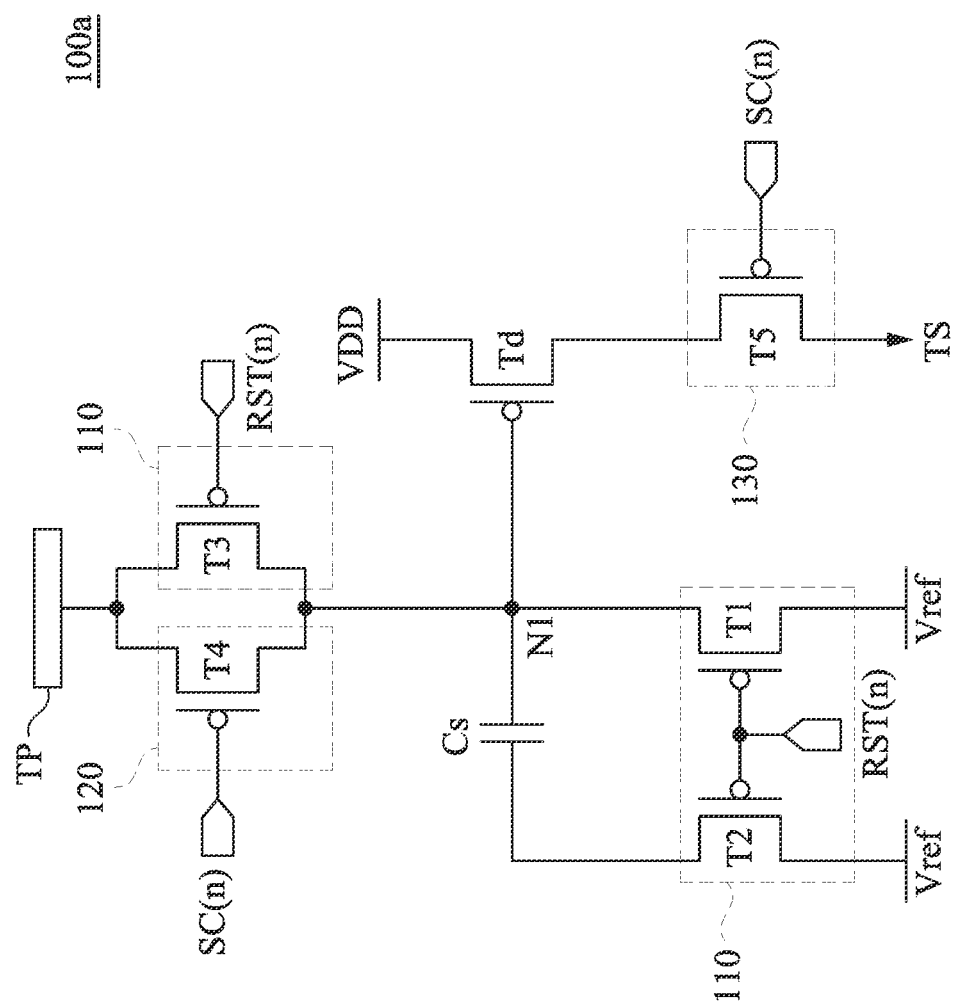
FIG. 1B shows a circuit architecture diagram of the driving circuit in FIG. 1A according to some embodiment of the present disclosure.

Please refer to FIG. 1B, FIG. 1B shows a circuit architecture diagram of the driving circuit 100*a* in FIG. 1A according to some embodiment of the present disclosure.

As shown in FIG. 1B, the reset circuit 110 includes the first transistor T1, the second transistor T2, and the third transistor T3. The first terminal of the first transistor T1 is electrically coupled to the first terminal of the capacitor Cs and the gate terminal of the driving transistor Td, the second terminal of the first transistor T1 is electrically coupled to the reference voltage terminal Vref, and the gate terminal of the first transistor T1 is used to receive the first control signal RST(n). The first terminal of the second transistor T2 is electrically coupled to the second terminal of the capacitor Cs, the second terminal of the second transistor T2 is electrically coupled to the reference voltage terminal Vref, and the gate terminal of the second transistor T2 is used to receive the first control signal RST(n). The first terminal of the third transistor T3 is electrically coupled to the touch sensing electrode TP, the second terminal of the third transistor T3 is electrically coupled to the second terminal of the capacitor Cs, and the gate terminal of the third transistor T3 is used to receive the first control signal RST(n).

The sensing circuit 120 includes the fourth transistor T4. The first terminal of the fourth transistor T4 is electrically coupled to the touch sensing electrode TP, the second terminal of the fourth transistor T4 is electrically coupled to the first terminal of the capacitor Cs and the gate terminal of the driving transistor Td, and the gate terminal of the fourth transistor T4 is used to receive the second control signal SC(n).

The read circuit 130 includes the fifth transistor T5. The first terminal of the fifth transistor T5 is electrically coupled to the second terminal of the driving transistor Td, the second terminal of the fifth transistor T5 is used to output the touch sensing signal TS, and the gate terminal of the fifth transistor T5 is used to receive the second control signal SC(n).

In operation, firstly, by controlling the logic level of the first control signal RST(n), the electric potential of the reference voltage terminal Vref can be respectively transmitted to the gate terminal of the driving transistor Td and the touch sensing electrode TP through the first transistor T1 and the third transistor T3, and reset the gate terminal of the driving transistor Td and the electric potential of the touch sensing electrode TP. Then, by controlling the logic level of the second control signal SC(n), the electric potential of the touch sensing electrode TP can be transmitted to the gate terminal of the driving transistor Td through the fourth transistor T4. In this way, the driving transistor Td outputs the touch sensing signal TS through the fifth transistor T5 according to the electric potential of gate terminal of the driving transistor, thereby performing touch sensing.

Figure 2A:
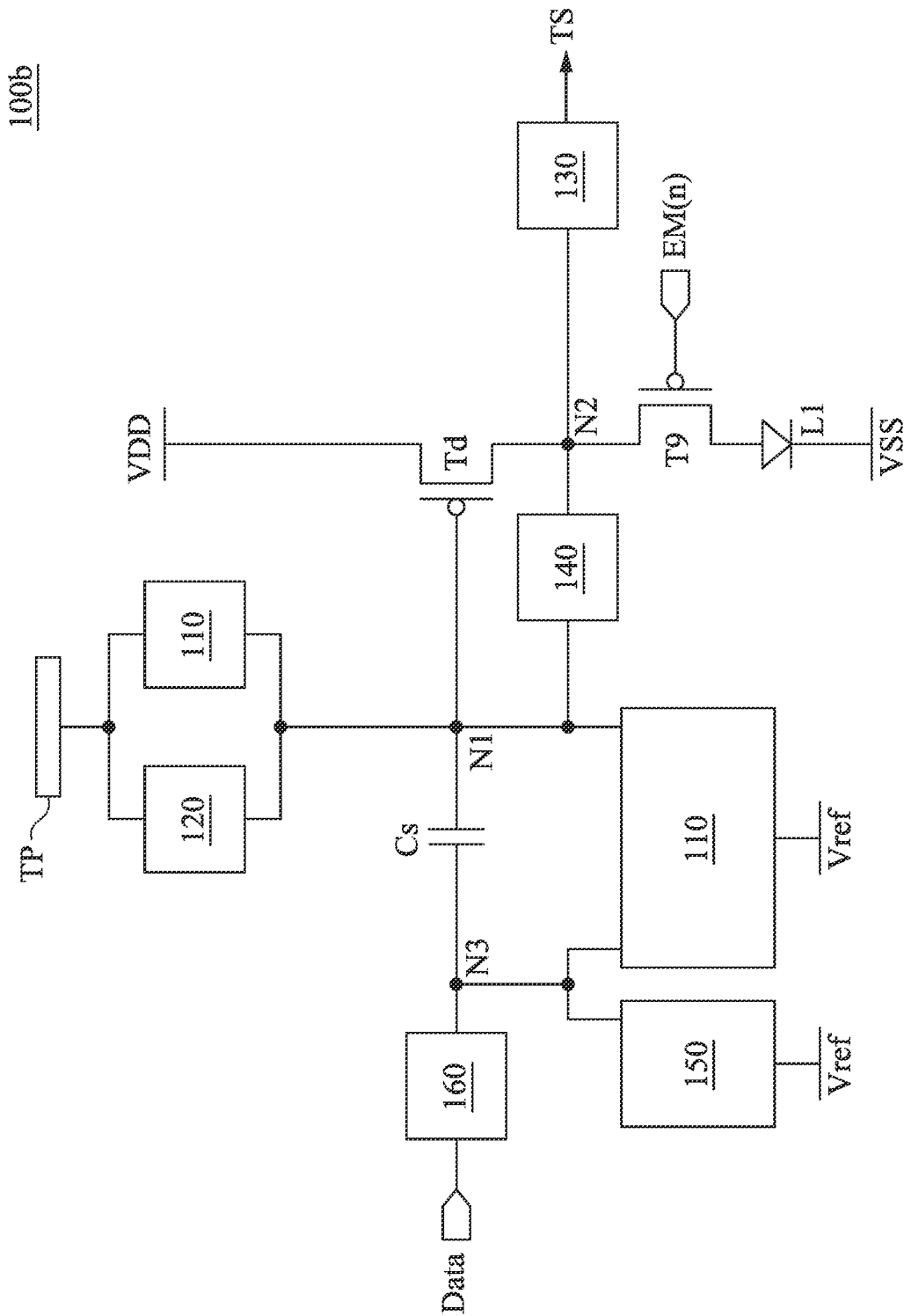
FIG. 2A shows a function block diagram of the driving circuit according to some embodiment of the present disclosure.

Please refer to FIG. 2A, FIG. 2A shows a function block diagram of the driving circuit 100*b* according to some embodiment of the present disclosure. As shown in FIG. 2A, the driving circuit 100*b* includes the touch sensing electrode TP, the reset circuit 110, the sensing circuit 120, the read circuit 130, the capacitor Cs, and the driving transistor Td.

The connection relationship and operation method of the touch sensing electrode TP, the reset circuit 110, the sensing circuit 120, the read circuit 130, the capacitor Cs, and the driving transistor Td of the driving circuit 100*b* of FIG. 2A are respectively similar to the connection relationship and operation method of the touch sensing electrode TP, the reset circuit 110, the sensing circuit 120, the read circuit 130, the capacitor Cs, and the driving transistor Td of FIG. 1A. Therefore, it will not repeat here.

The driving circuit 100*b* further includes the compensating circuit 140, the voltage stabilizing circuit 150, the writing circuit 160, and the light emitting element L1. In some embodiment, the light emitting element L1 can be implemented by micro light emitting diodes, light emitting diodes, mini light emitting diodes, or other light emitting elements.

On the structure, the driving transistor Td and the light emitting element L1 are electrically connected in series between the first system voltage terminal VDD and the second system voltage terminal VSS. In detail, the first terminal of the driving transistor Td is electrically coupled to the first system voltage terminal VDD, the second terminal of the driving transistor Td is electrically coupled to the first terminal of the ninth transistor T9, the second terminal of the ninth transistor T9 is electrically coupled to the first terminal of the light emitting element L1, the gate terminal of the ninth transistor T9 is used to receive the fifth control signal EM(n). The second terminal of the light emitting element L1 is electrically coupled to the second system voltage terminal VSS.

The driving transistor Td is used to provide the driving current to the light emitting element L1 according to the electric potential of the gate terminal of the driving transistor to drive the light emitting element L1 to emit light. Furthermore, the ninth transistor T9 is energized by the fifth control signal EM(n) to conduct the aforementioned driving current of the current path from the first system voltage terminal VDD through the driving transistor Td, the ninth transistor T9, and the light emitting element L1 to the second system voltage terminal VSS.

The compensating circuit 140 is electrically coupled between the gate terminal and the second terminal of the driving transistor Td, and the compensating circuit 140 is used to compensate the critical voltage of the driving transistor Td.

The first terminal of the capacitor Cs is electrically coupled to the driving transistor Td, and the second terminal of the capacitor Cs is electrically coupled to the voltage stabilizing circuit 150.

The voltage stabilizing circuit 150 is electrically coupled between the second terminal of the capacitor Cs and the reference voltage terminal Vref, and the voltage stabilizing circuit 150 is used to stabilize the electric potential of the second terminal of the capacitor Cs.

The writing circuit 160 is electrically coupled to the second terminal of the capacitor Cs, and the writing circuit 160 is used to transmit the data signal DATA to the second terminal of the capacitor Cs.

Figure 2B:
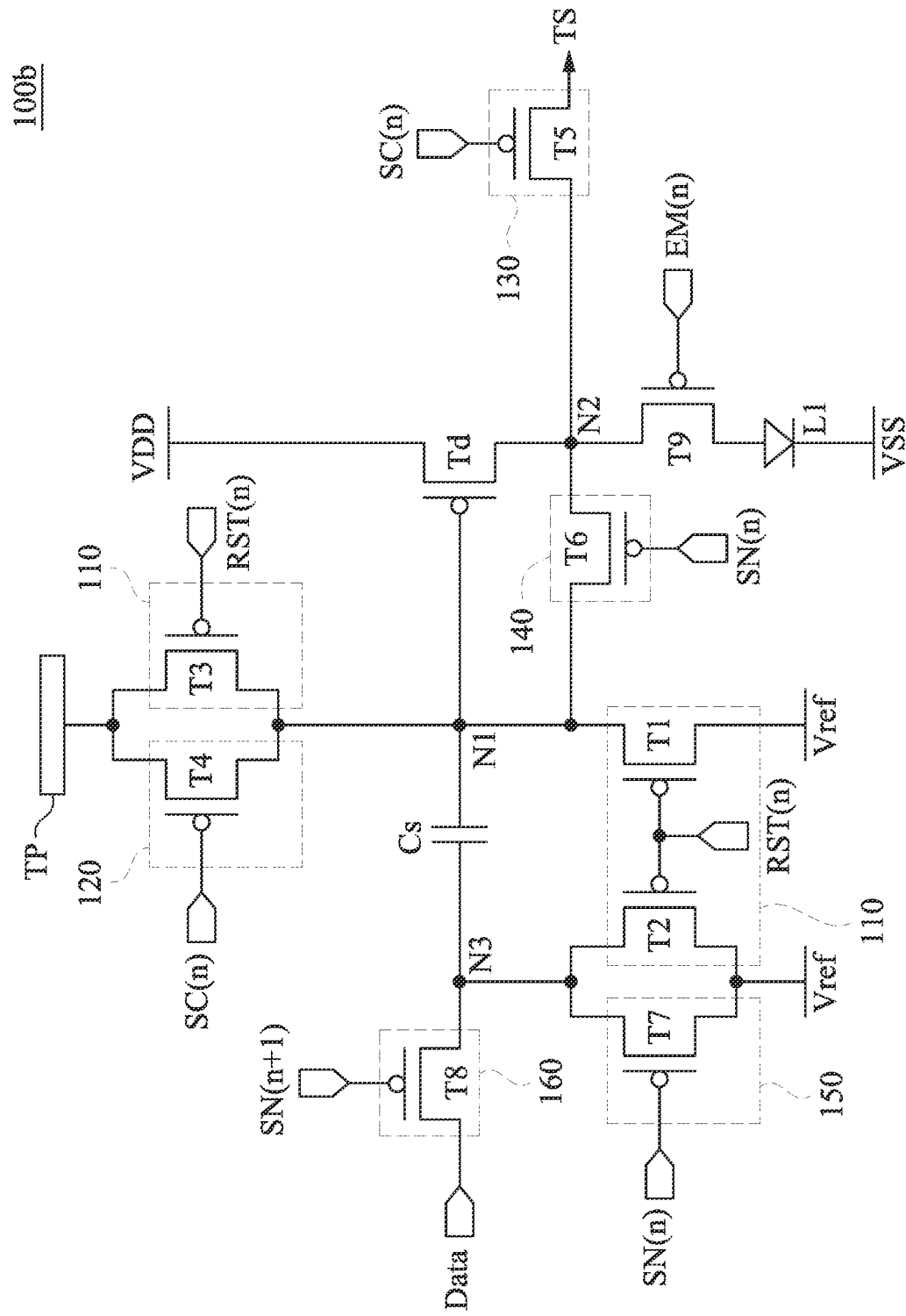
FIG. 2B shows a circuit architecture diagram of the driving circuit in FIG. 2A according to some embodiment of the present disclosure.

Please refer to FIG. 2B, FIG. 2B shows a circuit architecture diagram of the driving circuit 100*b* in FIG. 2A according to some embodiment of the present disclosure.

As shown in FIG. 2B, the reset circuit 110 includes the first transistor T1, the second transistor T2, and the third transistor T3. The sensing circuit 120 includes the fourth transistor T4. The read circuit 130 includes the fifth transistor T5.

The first transistor T1, the second transistor T2, the third transistor T3, the fourth transistor T4, and the fifth transistor T5 of the driving circuit 100*b* of the FIG. 2B are connected similarly to the first transistor T1, the second transistor T2, the third transistor T3, the fourth transistor T4, and the fifth transistor T5 of FIG. 1B, respectively. Therefore, it will not repeat here.

The compensating circuit 140 includes the sixth transistor T6. The first terminal of the sixth transistor T6 is electrically coupled to the second terminal of the driving transistor Td, the second terminal of the sixth transistor T6 is electrically coupled to the gate terminal of the driving transistor Td, the gate terminal of the sixth transistor T6 is used to receive the third control signal SN(n). Wherein the node N1 is at the connection between the gate terminal of the driving transistor Td and the second terminal of the sixth transistor T6, and the nodes N2 is at the connection between the second terminal of the driving transistor Td and the first terminal of the sixth transistor T6.

The voltage stabilizing circuit 150 includes the seventh transistor T7. The first terminal of the seventh transistor T7 is electrically coupled to the second terminal of the capacitor Cs, the second terminal of the seventh transistor T7 is electrically coupled to the reference voltage terminal Vref, and the gate terminal of the seventh transistor T7 is used to receive the third control signal SN(n).

The writing circuit 160 includes the eighth transistor T8. The first terminal of the eighth transistor T8 is electrically coupled to the first terminal of the capacitor Cs, the second terminal of the eighth transistor T8 is configure to receive the data signal DATA, and the gate terminal of the eighth transistor T8 is used to receive the fourth control signal SN(n+1). The node N3 is at the connection between the second terminal of the capacitor Cs and the eighth transistor T8.

Figure 3:
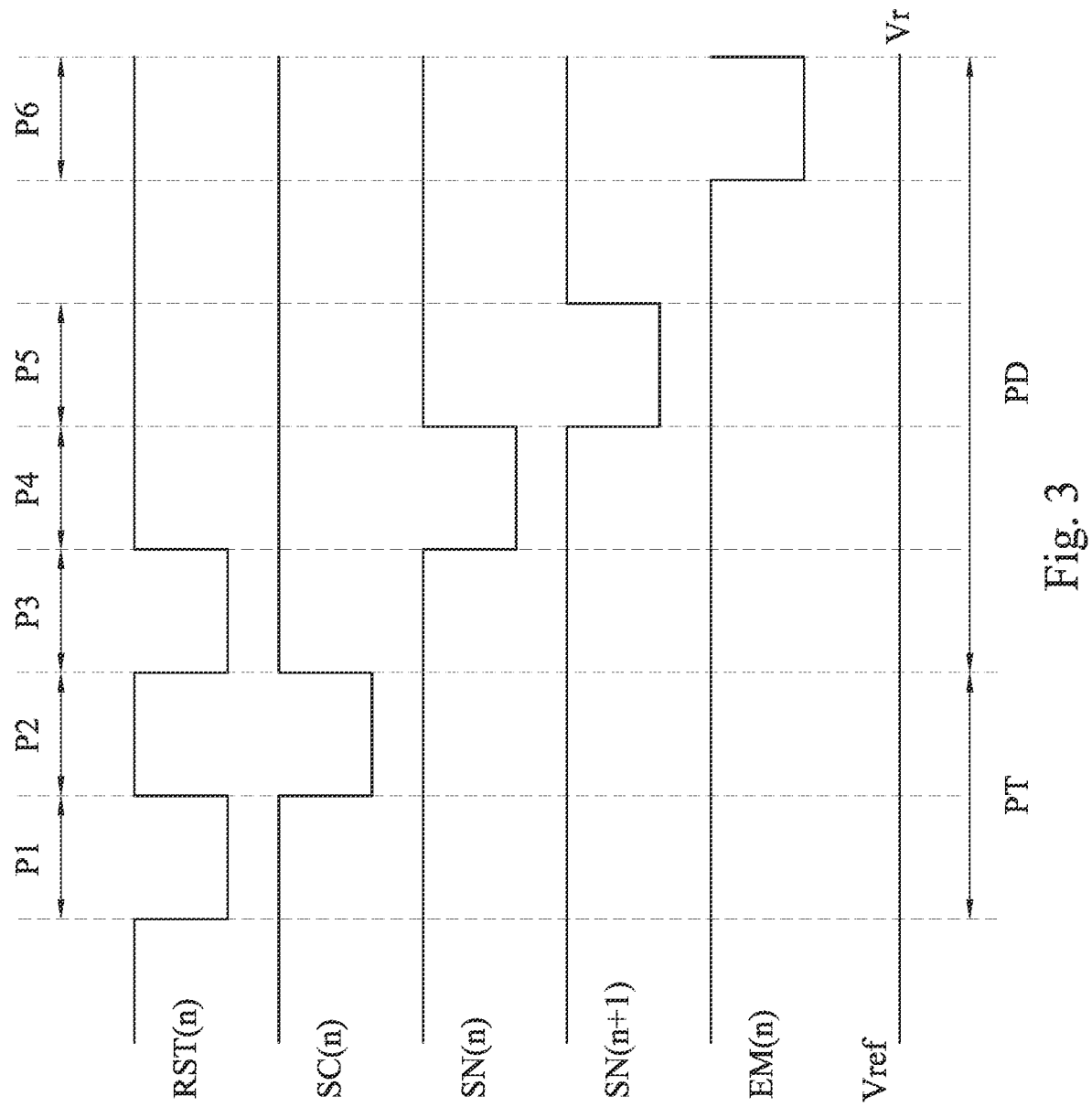
FIG. 3 is a timing diagram of the control signals of the driving circuit in FIG. 2B according to an embodiment.

Please refer to FIG. 3, FIG. 3 is a timing diagram of the control signals of the driving circuit 100*b* in FIG. 2B according to an embodiment. As shown in FIG. 3, the display cycle in the control timing of the driving circuit 100*b* can be divided into two phases, which are the touch sensing phase PT and the display phase PD. The touch sensing phase PT includes the reset period P1, and the sensing period P2. The display phase PD includes the reset period P3, the compensation period P4, the writing period P5, and the emitting light period P6. In particular, the lengths of the plural periods in FIG. 3 are for illustrative purposes only and are not intended to limit the present disclosure.

In detail, the first control signal RST(n) has the first logic level (for example: the low logic level) during the reset period P1, P3; the first control signal RST(n) has the second logic level (for example: the high logic level) during the sensing period P2, the compensation period P4, the writing period P5, and the emitting light period P6. The second control signal SC(n) has the first logic level during the sensing period P2; the second control signal SC(n) has the second logic level during the reset period P1, the reset period P3, the compensation period P4, the writing period P5, and the emitting light period P6. The third control signal SN(n) has the first logic level during the compensation period P4; the third control signal SN(n) has the second logic level during the reset period P1, the sensing period P2, the reset period P3, the writing period P5, and the emitting light period P6. The fourth control signal SN(n+1) has the first logic level during the writing period P5; the fourth control signal SN(n+1) has the second logic level during the reset period P1, the sensing period P2, the reset period P3, the compensation period P4, and the emitting light period P6. The fifth control signal EM(n) has the first logic level during the emitting light period P6; the fifth control signal EM(n) has the second logic level during reset period P1, the sensing period P2, reset period P3, the compensation period P4, and the writing period P5.

In some embodiment, the first control signal RST(n) is the reset control signal, the second control signal SC(n) is the sensing control signal, and the fifth control signal EM(n) is the emitting light control signal.

Figure 4A:
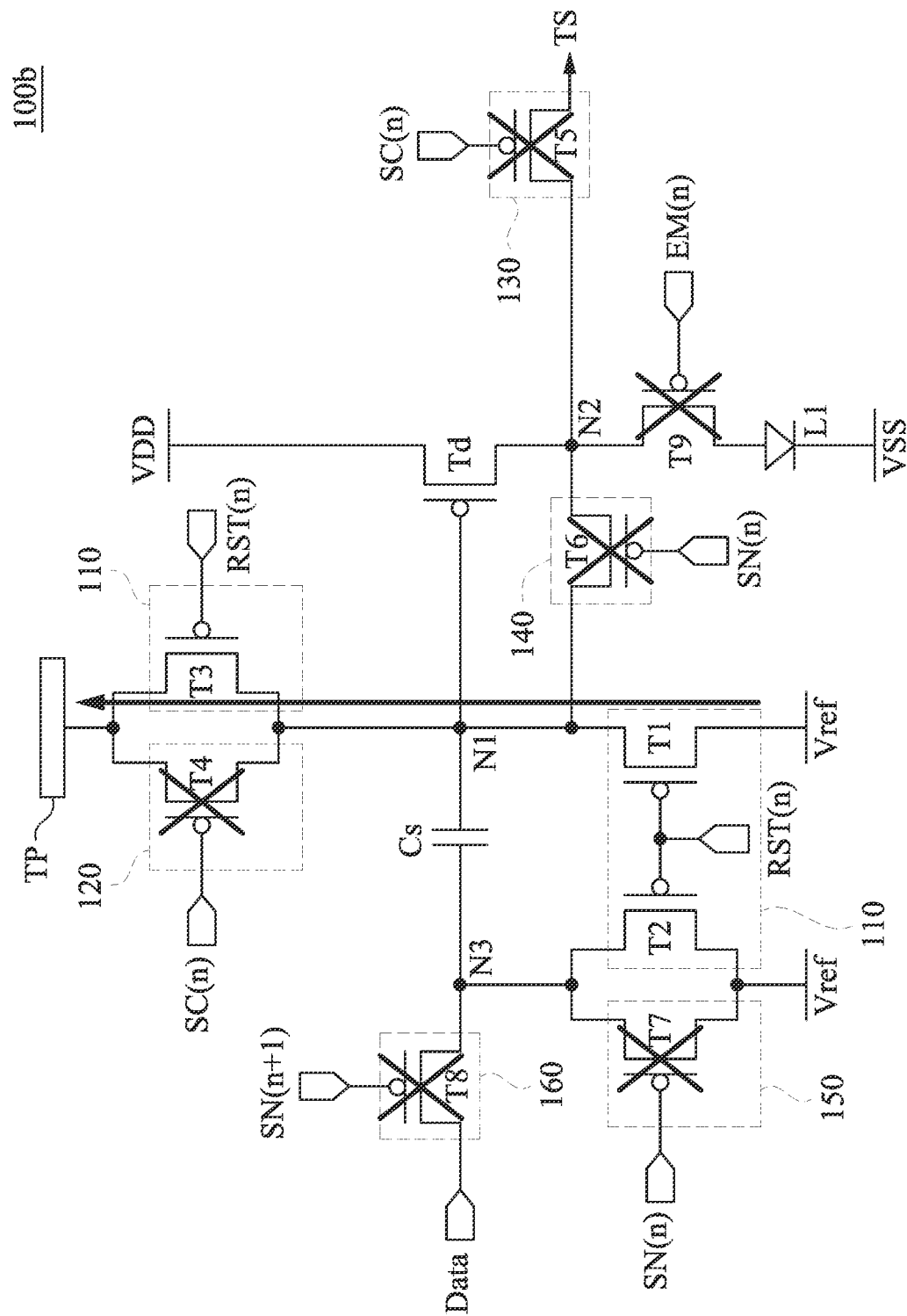
FIG. 4A is a circuit state diagram of the driving circuit in FIG. 2B during the reset period P1.
Figure 4B:
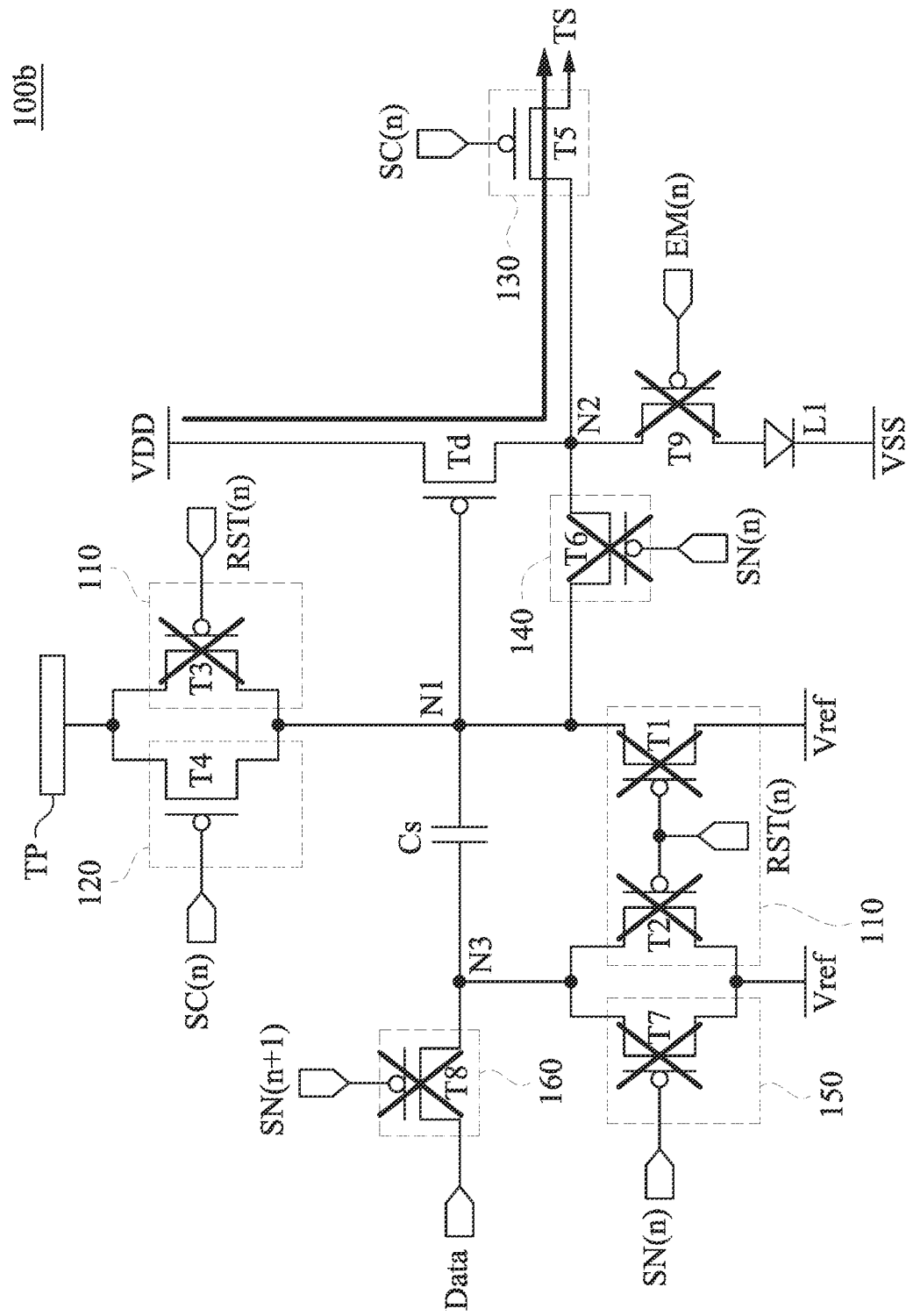
FIG. 4B is a circuit state diagram of the driving circuit in FIG. 2B during the sensing period P2.
Figure 4C:
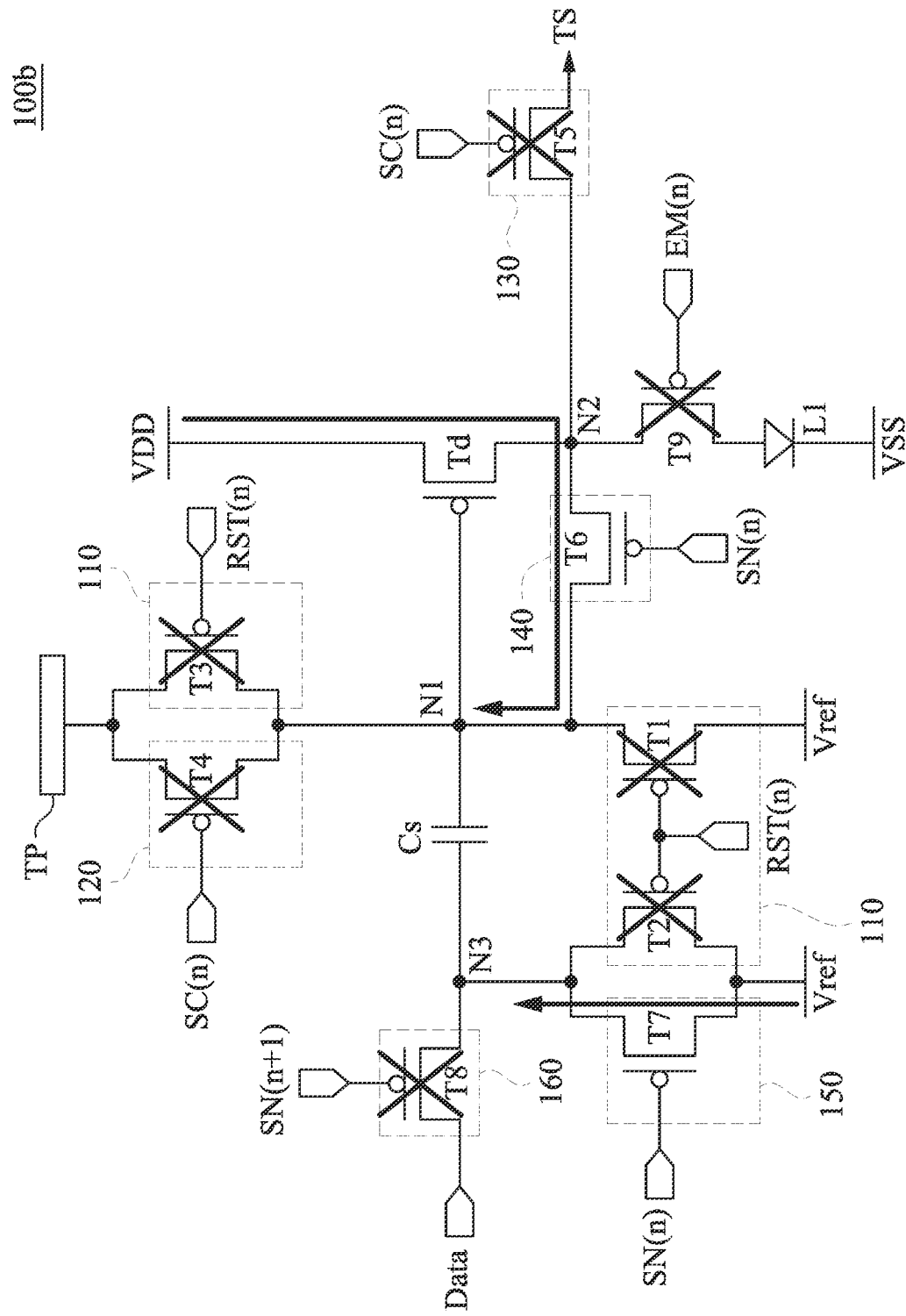
FIG. 4C is a circuit state diagram of the driving circuit in FIG. 2B during the compensation period P4.
Figure 4D:
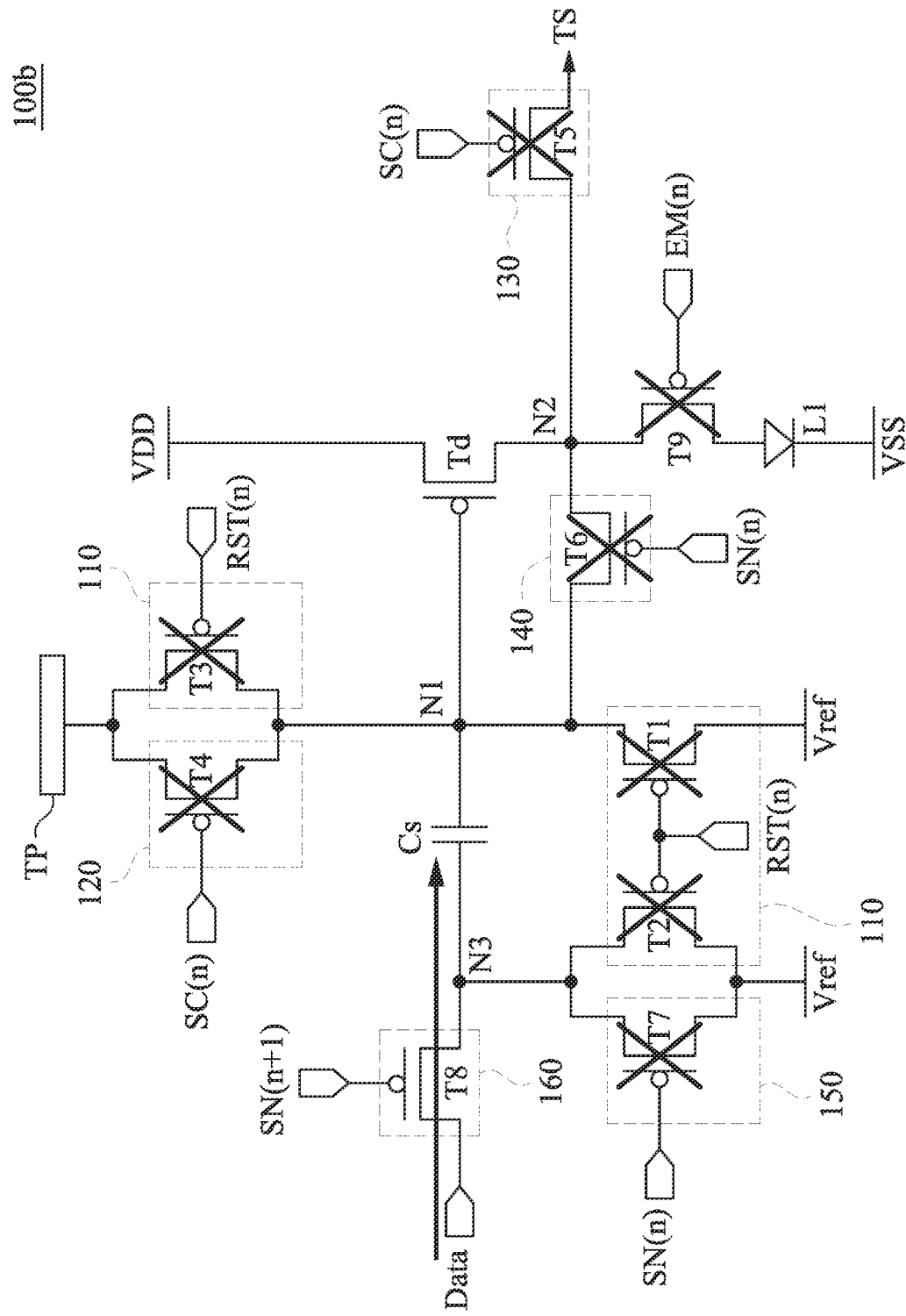
FIG. 4D is a circuit state diagram of the driving circuit in FIG. 2B during the writing period P5.
Figure 4E:
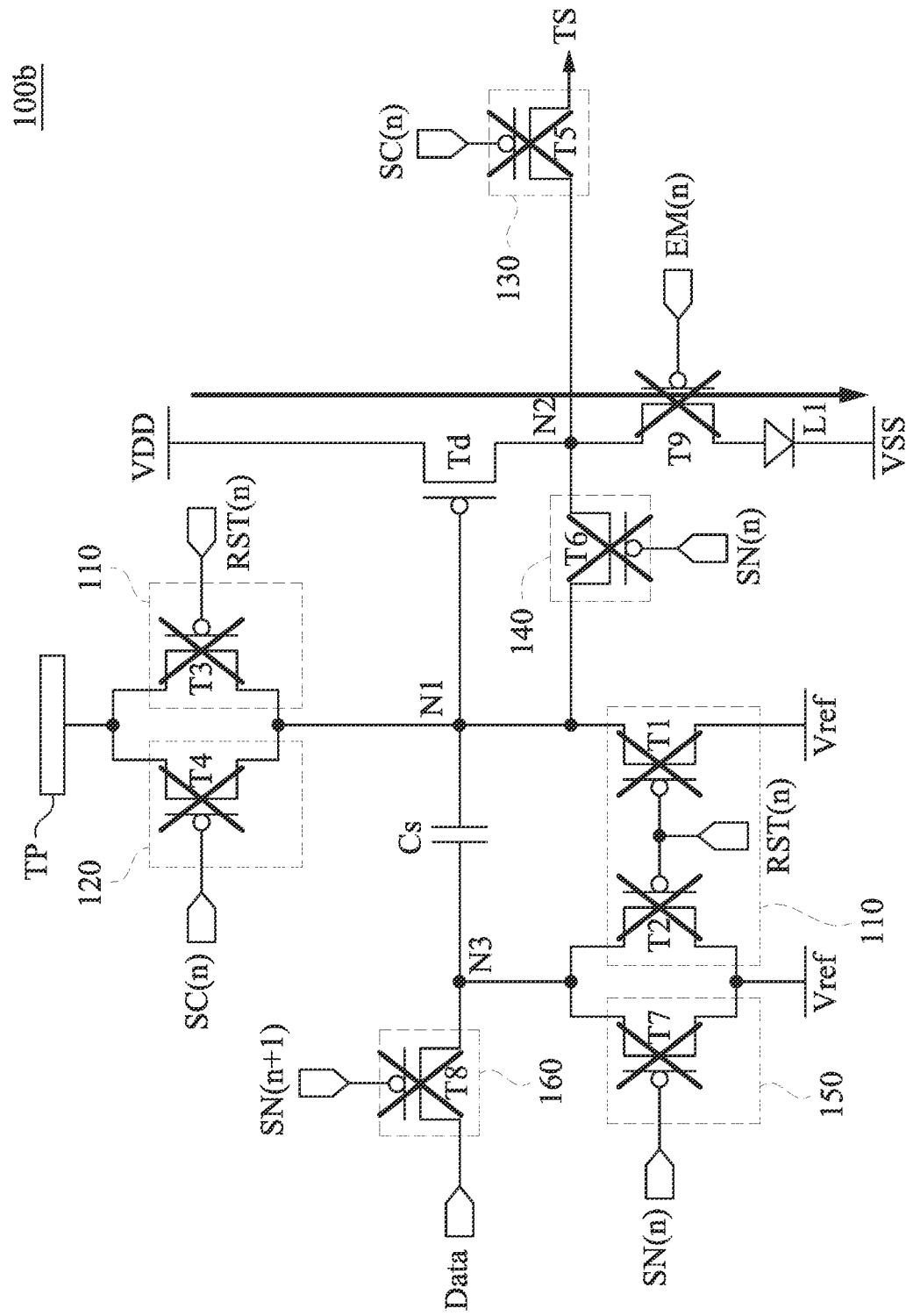
FIG. 4E is a circuit state diagram of the driving circuit in FIG. 2B during the emitting light period P6.

To make the overall operation of the driving circuit 100*b* clearer and easier to understand, please refer to FIG. 2B, FIG. 3, and FIGS. 4A to 4E together. FIG. 4A is a circuit state diagram of the driving circuit in FIG. 2B during the reset period P1. FIG. 4B is a circuit state diagram of the driving circuit in FIG. 2B during the sensing period P2. FIG. 4C is a circuit state diagram of the driving circuit in FIG. 2B during the compensation period P4. FIG. 4D is a circuit state diagram of the driving circuit in FIG. 2B during the writing period P5. FIG. 4E is a circuit state diagram of the driving circuit in FIG. 2B during the emitting light period P6.

During reset period P1, the first transistor T1, the second transistor T2, and the third transistor T3 are turn on because the first control signal RST(n) has the low logic level. In the other side, the fourth transistor T4, the fifth transistor T5, the sixth transistor T6, the seventh transistor T7, the eighth transistor T8, and the ninth transistor T9 are turned off because the second control signal SC(n), the third control signal SN(n), the fourth control signal SN(n+1), and the fifth control signal EM(n) have the high logic level.

In detail, during the reset period P1, the voltage Vr of the reference voltage terminal Vref will be transmitted to the second terminal of the capacitor Cs through the second transistor T2, so that the electric potential of the second terminal (node N3) of the capacitor Cs is substantially equal to the voltage Vr. The voltage Vr of the reference voltage terminal Vref will be transmitted to the node N1 through the first transistor T1, so that the electric potential of the gate terminal of the driving transistor Td and the first terminal (node N1) of the capacitor Cs is substantially equal to the voltage Vr. Also, the voltage Vr of the reference voltage terminal Vref will also be transmitted to the touch sensing electrode TP through the first transistor T1 and the third transistor T3, so that the electric potential of the touch sensing electrode TP is substantially equal to the voltage Vr. In this way, during the reset period P1, the electric potential of the gate terminal of the driving transistor Td and the second terminal of the capacitor Cs can be reset and stabilized at the voltage Vr, and the driving circuit 100*b* completes the reset operation.

During the sensing period P2, the fourth transistor T4 and the fifth transistor T5 are turned on because the second control signal SC(n) has the low logic level. In the other side, the first transistor T1, the second transistor T2, the third transistor T3, the sixth transistor T6, the seventh transistor T7, the eighth transistor T8, and the ninth transistor T9 are turned off because the first control signal RST(n), the third control signal SN(n), the fourth control signal SN(n+1), and the fifth control signal EM(n) have the high logic level.

In detail, during the sensing period P2, the node N1 will be electrically isolated from the reference voltage terminal Vref because the first transistor T1, the second transistor T2, and the seventh transistor T7 are switched off. Also, the node N1 will be electrically isolated from the second system voltage terminal VSS because the eighth transistor T8 and the ninth transistor T9 are switched off.

When the second control signal SC(n) switches from high level to low level at the beginning of the sensing period P2, the electric potential of the node N1 is lowered by the parasitic capacitor, and the lowered electric potential of the node N1 is expressed as the voltage Vft1. In some embodiment, the voltage Vft1 can be expressed by the following equation:

$$Vft1=Cgs*(VGH-VGL)/(Cs+Cgs) \ldots \quad \text{Formula (1)}$$

In the above formula, Cgs can be the parasitic capacitance of the element of the electrical coupling the node N1 (for example, the fifth transistor T5), VGH, VGL can be the high electric potential and the low electric potential of the second control signal SC(n), respectively, and Cs can be the capacitance value of the capacitor Cs.

That is, if the user does not touch the display panel and thus the touch sensing electrode TP is not electrically coupled to the additional equivalent capacitor, the electric potential of the node N1 will be the voltage Vr of the reference voltage terminal Vref minus Vft1.

In the other side, if the user's finger touches the display panel, the user's finger will be treated as (equivalent to) the electrical coupling to the capacitance of the touch sensing electrode TP, and the second control signal SC(n) will lower the electric potential of the node N1 through the parasitic capacitance when switching from high level to low level at the beginning of the sensing period P2, and the lowered electric potential of the node N1 is expressed as the voltage Vft2. In some embodiment, the voltage Vft2 can be expressed by the following formula:

$$Vft2=Cgs*(VGH-VGL)/(Cs+Cgs+Cf) \ldots \quad \text{Formula (2)}$$

Similarly, in the above formula, Cgs can be the parasitic capacitance of the element of the electrical coupling the node N1 (for example, the fifth transistor T5), VGH, VGL can be the high potential and the low potential of the second control signal SC(n), respectively, Cs can be regarded as the capacitance value of the capacitance Cs, and Cf can be regarded as the capacitance value equivalent to the electrical coupling contact when the user's finger touches the display panel.

That is, if the touch sensor TP is electrically coupled to the additional equivalent capacitor because the user has touched the display panel, the electric potential of the node N1 will be the voltage Vr of the reference voltage terminal Vref minus the voltage Vft2.

According to the formula (1) and the formula (2), the value of the voltage Vft2 will be smaller than the value of the voltage Vft1, and the potential of the node N1 will be the voltage Vr of the reference voltage Vref minus the voltage Vft2 or Vft1, and the electric potential of the node N1 will be at a higher level when the user has touched the display panel compared to when the user has not touched the display panel.

Also, during the sensing period P2, the driving transistor Td provides the current to the read circuit 130 from the first system voltage terminal VDD according to the electric potential of the gate terminal (node N1) of the driving transistor, so that the read circuit 130 uses the aforementioned current as the touch sensing signal TS. The electric potential of the gate terminal of the driving transistor Td will be at the higher level when the user touches the display panel than when the user does not touch the display panel, thus providing the smaller current for the touch sensing signal TS.

For example, if the user does not touch the display panel, the driving transistor Td will provide 27.6 micro amps of current as the touch sensing signal TS. On the other hand, if the user touches the display panel, the driving transistor Td will provide the current of 17.3 micro amps as the touch sensing signal TS. In this way, during the sensing period P2, the driving circuit 100b completes the touch sensing operation.

Furthermore, depending on the gap depth of the user's fingerprint, the capacitance value Cf of the equivalent electrical coupling contact the touch sensing electrode TP will have different values, and the driving transistor Td will provide different amplitude currents as the touch sensing signal TS.

For example, if the user lightly touches the display panel, the larger gap between the user's fingerprint and the display panel will cause the capacitance value Cf to be at the smaller value and the driving transistor Td to provide the larger (for example, 26.6 micro amps) current as the touch sensing signal TS. On the other hand, if the user touches the display panel more closely, a smaller gap between the user's fingerprint and the display panel will cause the capacitance value Cf to be at the larger value and the driving transistor Td to provide the smaller (for example, 18.8 micro amps) current as the touch sensing signal TS. In this way, during the sensing period P2, the driving circuit 100b can further differentiate between the user's finger and the display panel in terms of how closely it touches.

Next, in order to reset the electric potential of the driving transistor Td to the voltage Vr of the reference voltage terminal Vref, the reset operation is performed during the reset period P3.

During the reset period P3, the first transistor T1, the second transistor T2, and the third transistor T3 are turned on because the first control signal RST(n) has the low logic level. On the other hand, the fourth transistor T4, the fifth transistor T5, the sixth transistor T6, the seventh transistor T7, the eighth transistor T8, and the ninth transistor T9 are turned off because the second control signal SC(n), the third control signal SN(n), the fourth control signal SN(n+1), and the fifth control signal EM(n) have the high logic level.

Since the operation of the driving circuit 100b during the reset period P3 is similar to the operation of the driving circuit 100b during the reset period P1, it will not be repeated here.

During the compensation period P4, the sixth transistor T6 will be turned on because the third control signal SN(n) has the low logic level. On the other side, the first transistor T1, the second transistor T2, the third transistor T3, the fourth transistor T4, the fifth transistor T5, the seventh transistor T7, the eighth transistor T8, and the ninth transistor T9 will be turned off because the first control signal RST(n), the second control signal SC(n), the fourth control signal SN(n+1), and the fifth control signal EM(n) have the high logic level.

In detail, during the compensation period P4, the voltage Vdd of the first system voltage terminal VDD is transmitted by the driving transistor Td and the sixth transistor T6 to the gate terminal of the driving transistor Td until the driving transistor Td is cut off. That is, when the electric potential difference between the source terminal and the gate terminal of the driving transistor Td is approximately the same as the critical voltage Vth of the driving transistor Td, the driving transistor Td cuts off. At this time, the electric potential of the first terminal (source terminal) of the driving transistor Td is at the voltage Vdd, and the electric potential of the gate terminal (node N1) of the driving transistor Td is (Vdd–

|Vth|). In this way, the driving circuit 100b completes the compensation operation during the compensation period P4.

During the writing period P5, the eighth transistor T8 is turned on because the fourth control signal SN(n+1) has the low logic level. On the other side, the first transistor T1, the second transistor T2, the third transistor T3, the fourth transistor T4, the fifth transistor T5, the sixth transistor T6, the seventh transistor T7, and the ninth transistor T9 are turned off because the first control signal RST(n), the second control signal SC(n), the third control signal SN(n), and the fifth control signal EM(n) have the high logic level.

In detail, during the writing period P5, the voltage Vdata of the data signal DATA is transmitted from the eighth transistor T8 to the second terminal of the capacitor Cs, so that the electric potential of the second terminal (node N3) of the capacitor Cs is substantially equal to the voltage Vdata. Furthermore, the electric potential of the second terminal (node N3) of the capacitor Cs, which changes from the compensation period P4 to the writing period P5, is transmitted to the first terminal (node N1) by capacitive coupling. That is, the voltage (Vdata−Vr) increases at the first terminal (node N1), which means that the electric potential at the first terminal (node N1) of the capacitor Cs is essentially equal to [Vdd−|Vth|+(Vdata−Vr)]. At this time, the electric potential of the first terminal (source terminal) of the driving transistor Td is at the voltage Vdd. The voltage difference (Vsg) across the source terminal and the gate terminal of the driving transistor Td is Vdd−[Vdd−|Vth|+(Vdata−Vr)]=[(Vr−Vdata)+|Vth|].

In general, the driving current that the P-type transistor can provide obeys the following formula: $Id=k(Vsg-|Vth|)^2$ Wherein k is a constant related to the component characteristics of the driving transistor Td, and |Vth| is the absolute value of the critical voltage of the driving transistor Td.

The driving current Id is calculated by substituting the voltage (Vsg) across the source terminal and the gate terminal of the driving transistor Td into the equation of the driving current Id as follows:

$$Id=k(Vsg-|Vth|)^2$$

$$Id=k\{[(Vr-Vdata)+|Vth|]-|Vth|\}^2$$

$$Id=k(Vr-Vdata)^2$$

During the emitting light period P6, the driving transistor Td provides the driving current $Id=k(Vr-Vdata)^2$ to the light emitting element L1, so that the light emitting element L1 emits light according to the amplitude of the driving current Id.

For example, if the voltage Vdata of the data signal DATA written to the driving circuit 100b is larger during the writing period P5, the light emitting element L1 will be at the lower brightness (gray scale) based on the smaller driving current Id during the emitting light period P6 according to the aforementioned formula for the driving current Id; on the other side, if the voltage Vdata of the data signal DATA written to the driving circuit 100b is smaller, the light emitting element L1 will be at the higher brightness (gray scale) based on the larger driving current Id during the emitting light period P6 according to the aforementioned formula for the driving current Id.

Figure 5:
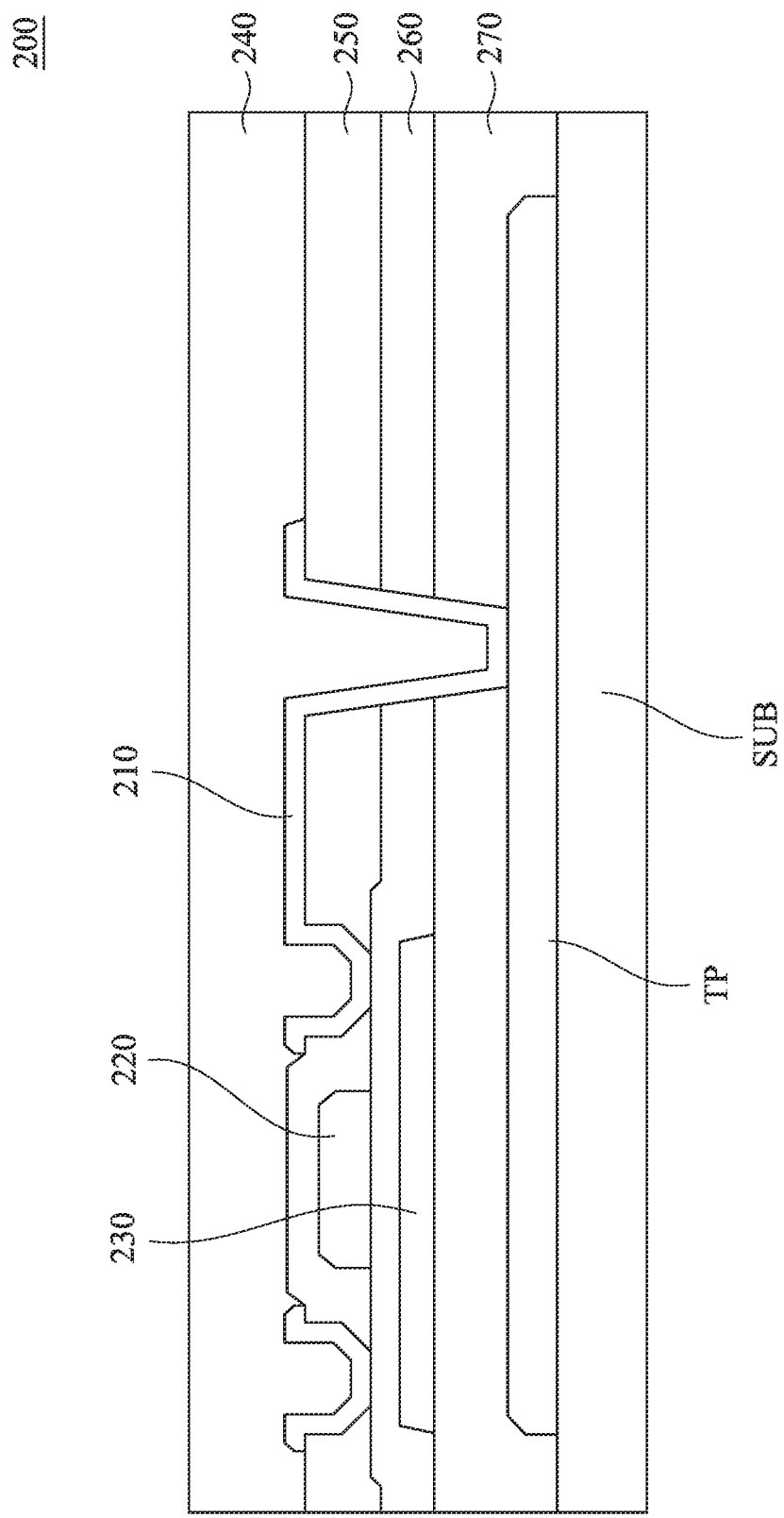
FIG. 5 is a schematic diagram of the structure of the touch sensing electrode in the thin film transistor layer in FIG. 2A and FIG. 2B.

Please refer to FIG. 5, FIG. 5 is a schematic diagram of the structure of the touch sensing electrode TP in the thin film transistor layer 200 in FIG. 2A and FIG. 2B.

As shown in FIG. 5, the thin film transistor layer 200 includes the substrate SUB, the source/drain terminal 210, the gate terminal 220, the polysilicon layer 230, the dielectric layer 240, the dielectric layer 250, the gate dielectric layer 260, the buffer layer 270, and the touch sensing electrode TP. It should be noted that the touch sensing electrode TP can be set at the position adjacent to the substrate SUB in the thin film transistor layer 200. More specifically, in the thin film transistor layer 200, the touch sensing electrode TP is provided between the buffer layer 270 and the substrate SUB. In this way, in some embodiments, the display panel realized by the driving circuit 100b can be the edge-lit light emitting display panel or the back-lit light emitting display panel.

Figure 6A:
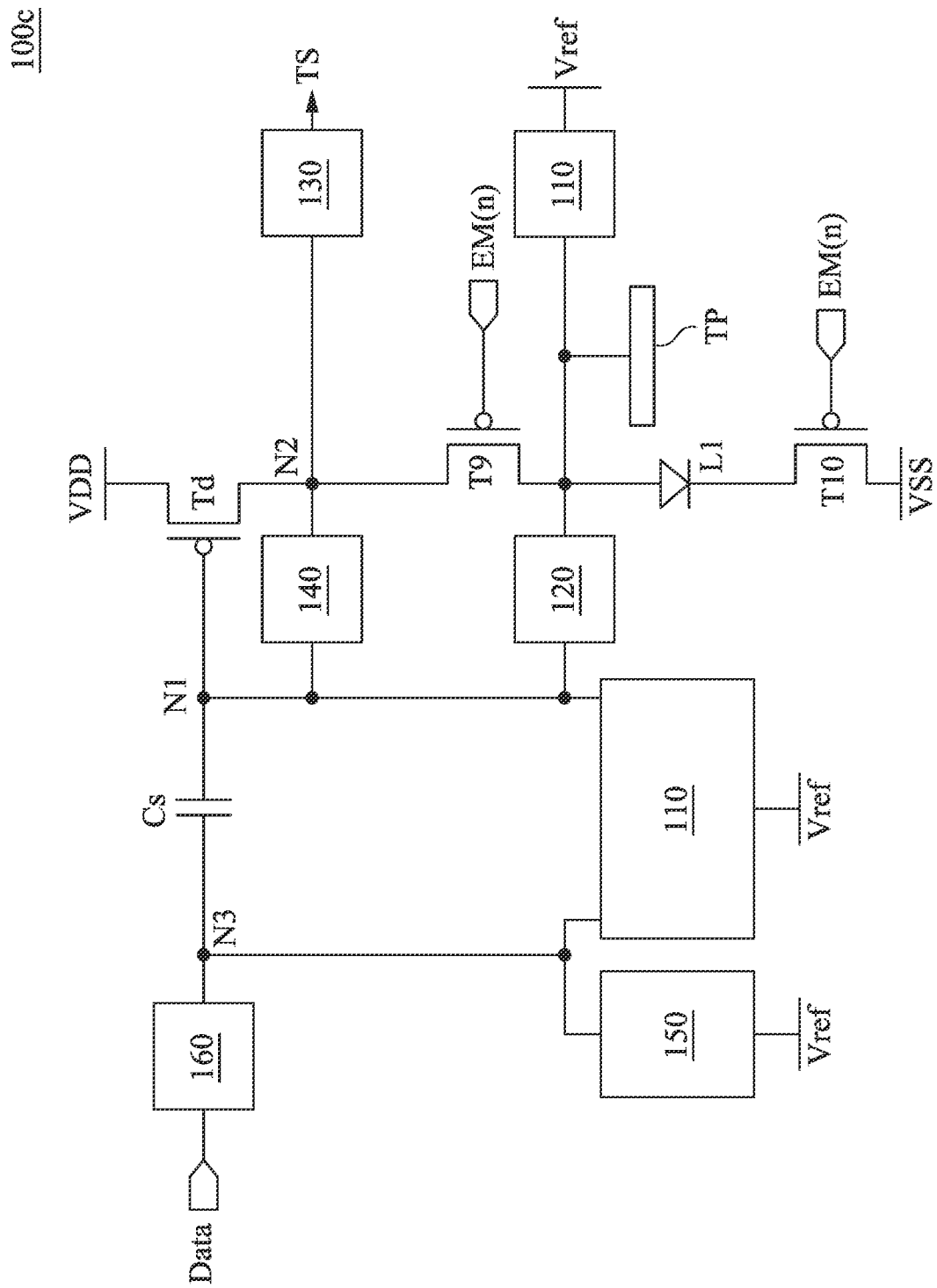
FIG. 6A shows a function block diagram of the driving circuit according to some embodiment of the present disclosure.

Please refer to FIG. 6A, FIG. 6A shows a function block diagram of the driving circuit 100c according to some embodiment of the present disclosure. As shown in FIG. 6A, the driving circuit 100c includes the touch sensing electrode TP, the reset circuit 110, the sensing circuit 120, the read circuit 130, the capacitor Cs, and the driving transistor Td.

The operation of the touch sensing electrode TP, the reset circuit 110, the sensing circuit 120, the read circuit 130, the capacitor Cs, and the driving transistor Td of the driving circuit 100c in FIG. 6A is similar to the operation of the touch sensing electrode TP, the reset circuit 110, the sensing circuit 120, the read circuit 130, the capacitor Cs, and the driving transistor Td of the driving circuit 100b in FIG. 2A, respectively. Therefore, it will not be repeated here.

The driving circuit 100c further includes the compensating circuit 140, the voltage stabilizing circuit 150, the writing circuit 160, the ninth transistor T9, the tenth transistor T10, and the light emitting element L1. In some embodiment, the light emitting element L1 can be implemented by the micro light emitting diode, the light emitting diode, the mini light emitting diode, or the other light emitting element.

It is important to note that the light emitting element L1 can be implemented by the light emitting diode (LED) chip. The aforementioned LED chip can be differentiated into the lateral, the flip, and the vertical structures depending on the location of the electrodes. In the embodiment of FIG. 6A, the touch sensing electrode TP of the driving circuit 100c can be implemented by the cathode electrode of the light emitting element L1 (for example, the light emitting diode chip) in any of the aforementioned structures, thereby reducing the additional electrical surface area of the touch sensor element in other embodiments.

On the structure, the driving transistor Td, the ninth transistor T9, the light emitting element L1, and the tenth transistor T10 are electrically coupled between the first system voltage terminal VDD and the second system voltage terminal VSS. In detail, the first terminal of the driving transistor Td is electrically coupled to the first system voltage terminal VDD, the second terminal of the driving transistor Td is electrically coupled to the first terminal of the ninth transistor T9, the second terminal of the ninth transistor T9 is electrically coupled to the first terminal of the light emitting element L1, and the gate terminal of the ninth transistor T9 is used to receive the fifth control signal EM(n). The second terminal of the light emitting element L1 is electrically coupled to the first terminal of the tenth transistor T10, and the second terminal of the tenth transistor T10 is electrically coupled to the second system voltage terminal VSS.

The driving transistor Td is used to provide the driving current to the light emitting element L1 according to the electric potential of the gate terminal to drive the light emitting element L1 to emit light. Furthermore, the ninth transistor T9 and the tenth transistor T10 are energized by the fifth control signal EM(n) to conduct the aforementioned driving current of the current path from the first system voltage terminal VDD through the driving transistor Td, the ninth transistor T9, the light emitting element L1, and the tenth transistor T10 to the second system voltage terminal VSS.

The compensating circuit 140 is electrically coupled between the gate terminal (node N1) of the driving transistor Td and the second terminal (node N2), and the compensating circuit 140 is used to compensate the critical voltage of the driving transistor Td.

The first terminal of the capacitor Cs is electrically coupled to the gate terminal (node N1) of the driving transistor Td, and the second terminal of the capacitor Cs is electrically coupled to the voltage stabilizing circuit 150.

The voltage stabilizing circuit 150 is electrically coupled between the second terminal of the capacitor Cs and the reference voltage terminal Vref, and the voltage stabilizing circuit 150 is used to stabilize the electric potential of the second terminal of the capacitor Cs.

The writing circuit 160 is electrically coupled to the second terminal (node N3) of the capacitor Cs, and the writing circuit 160 is used to transmit the data signal DATA to the second terminal (node N3) of the capacitor Cs.

Figure 6B:
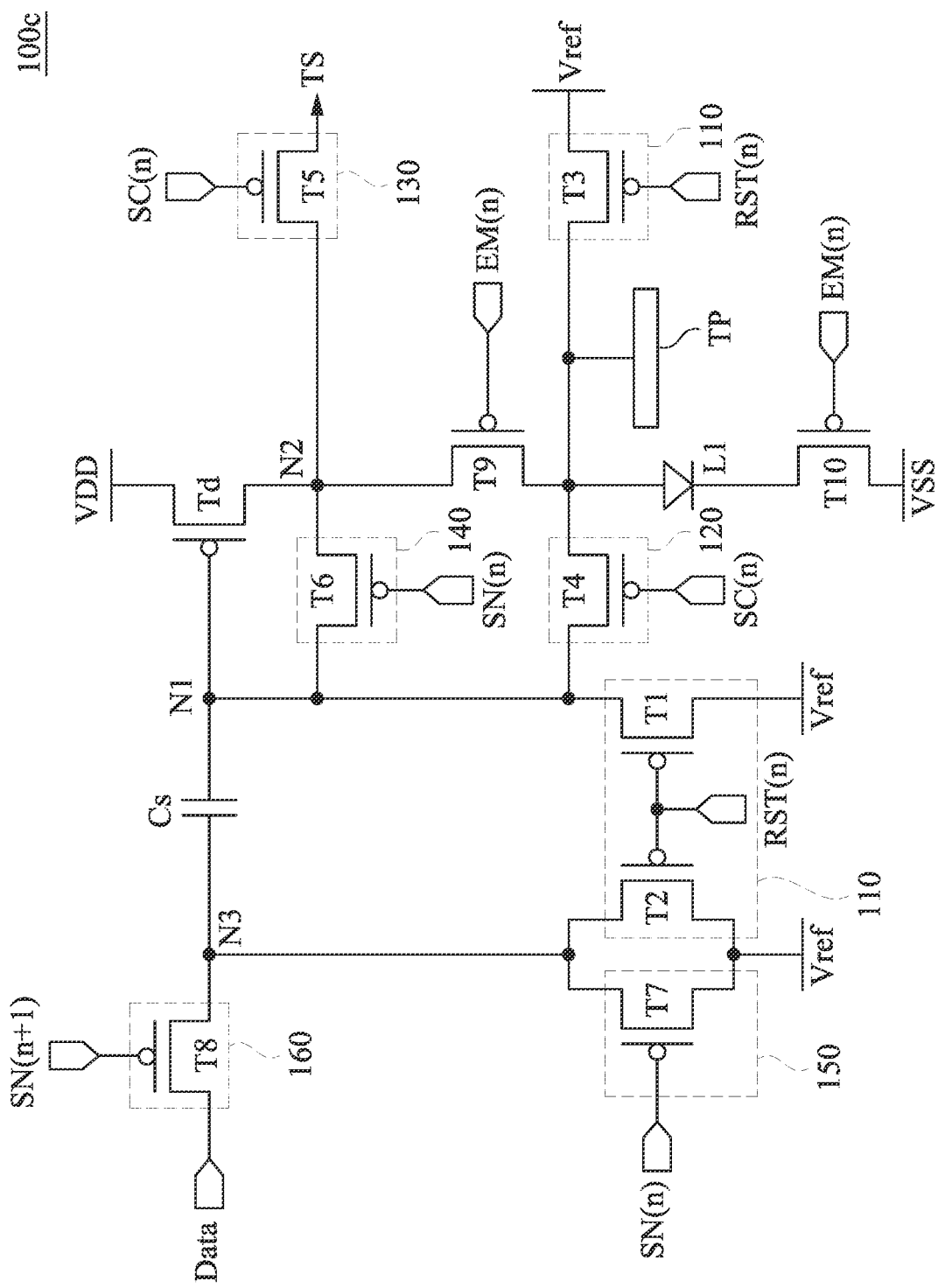
FIG. 6B shows the circuit architecture diagram of the driving circuit in FIG. 6A according to some embodiment of the present disclosure.

Please refer to FIG. 6B, FIG. 6B shows the circuit architecture diagram of the driving circuit 100c in FIG. 6A according to some embodiment of the present disclosure.

As shown in FIG. 6B, the reset circuit 110 includes the first transistor T1, the second transistor T2, and the third transistor T3. The sensing circuit 120 includes the fourth transistor T4. The read circuit 130 includes the fifth transistor T5.

On the structure, compared with the driving circuit 100b in the embodiment of FIG. 2B, the driving circuit 100c in the embodiment of FIG. 6B differs in the connection of the third transistor T3, the fourth transistor T4, and the touch sensing electrode TP. More precisely, in the driving circuit 100c shown in FIG. 6B, the third transistor T3, the touch sensing electrode TP, and the fourth transistor T4 are electrically connected in series between the reference voltage terminal Vref and the node N1. In the driving circuit 100b shown in FIG. 2B, the third transistor T3 and the fourth transistor T4 are connected in parallel and electrically coupled to the touch sensing electrode TP. Although the detailed connection relationships of the driving circuit 100b and 100c are not identical, the operations of the third transistor T3 and the fourth transistor T4 of the driving circuit 100c in FIG. 6B are similar to the operations of the third transistor T3 and the fourth transistor T4 of the driving circuit 100b in FIG. 2B. Therefore, it will not be repeated here.

The compensating circuit 140 includes the sixth transistor T6, the voltage stabilizing circuit 150 includes the seventh transistor T7, and the writing circuit 160 includes the eighth transistor T8. The connection relationship and operation method of the sixth transistor T6, the seventh transistor T7, and the eighth transistor T8 of the driving circuit 100c are similar to the connection relationship and the operation method of the sixth transistor T6, the seventh transistor T7, and the eighth transistor T8 of the driving circuit 100b in FIG. 2B, respectively. Therefore, it will not be repeated here.

Figure 7A:
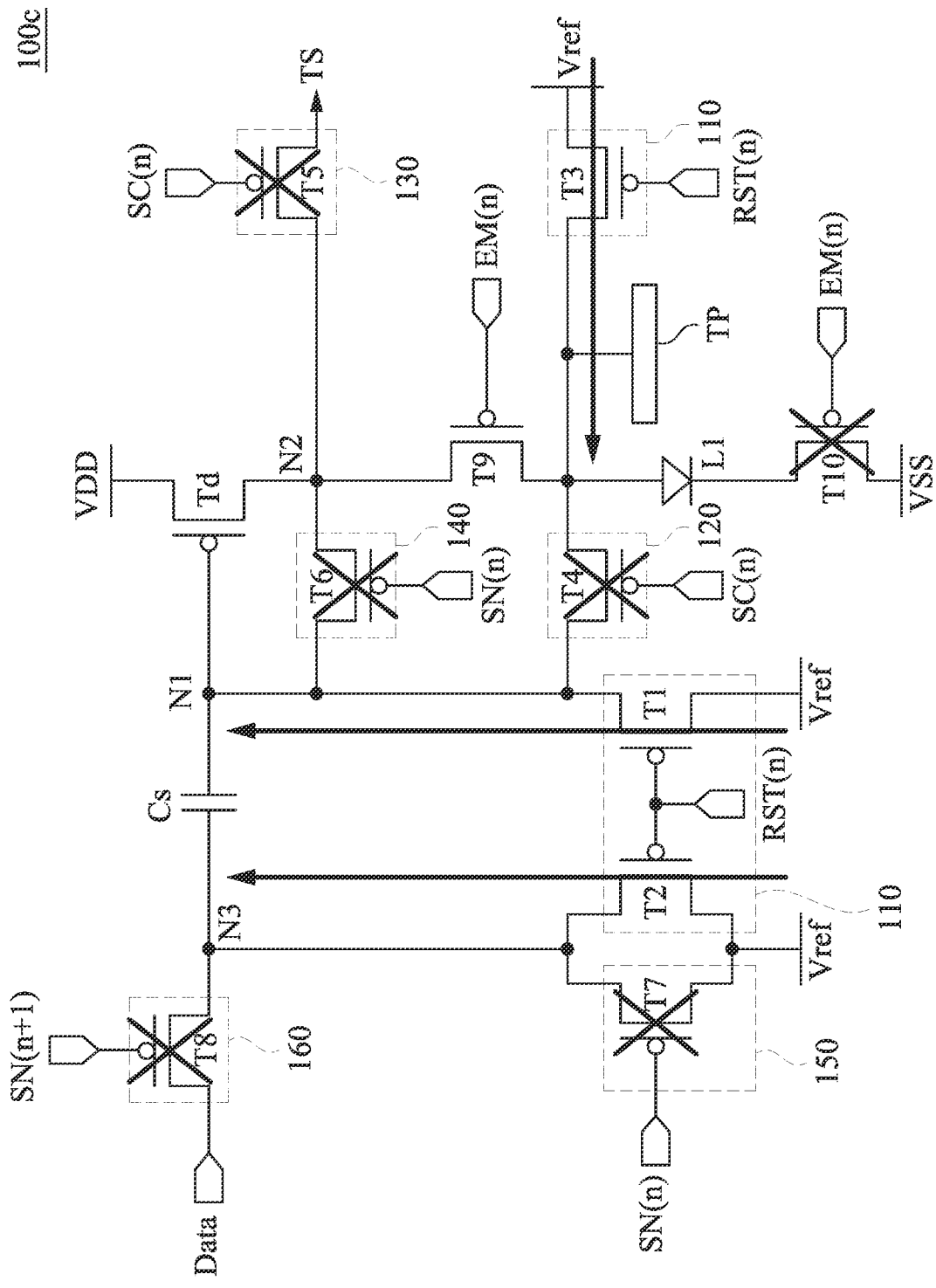
FIG. 7A is a circuit state diagram of the driving circuit in FIG. 6B during the reset period P1.
Figure 7B:
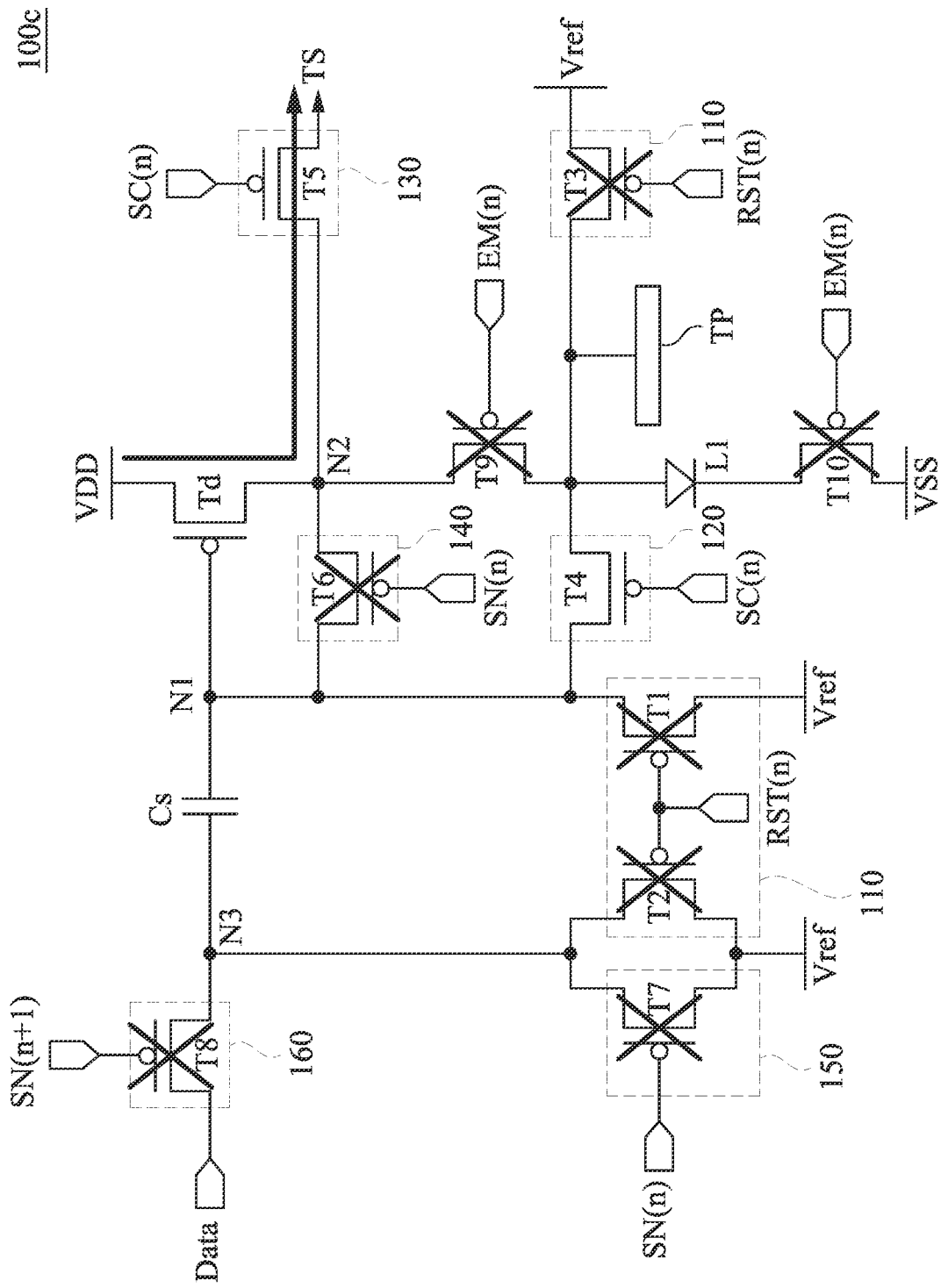
FIG. 7B is a circuit state diagram of the driving circuit in FIG. 6B during the sensing period P2.
Figure 7C:
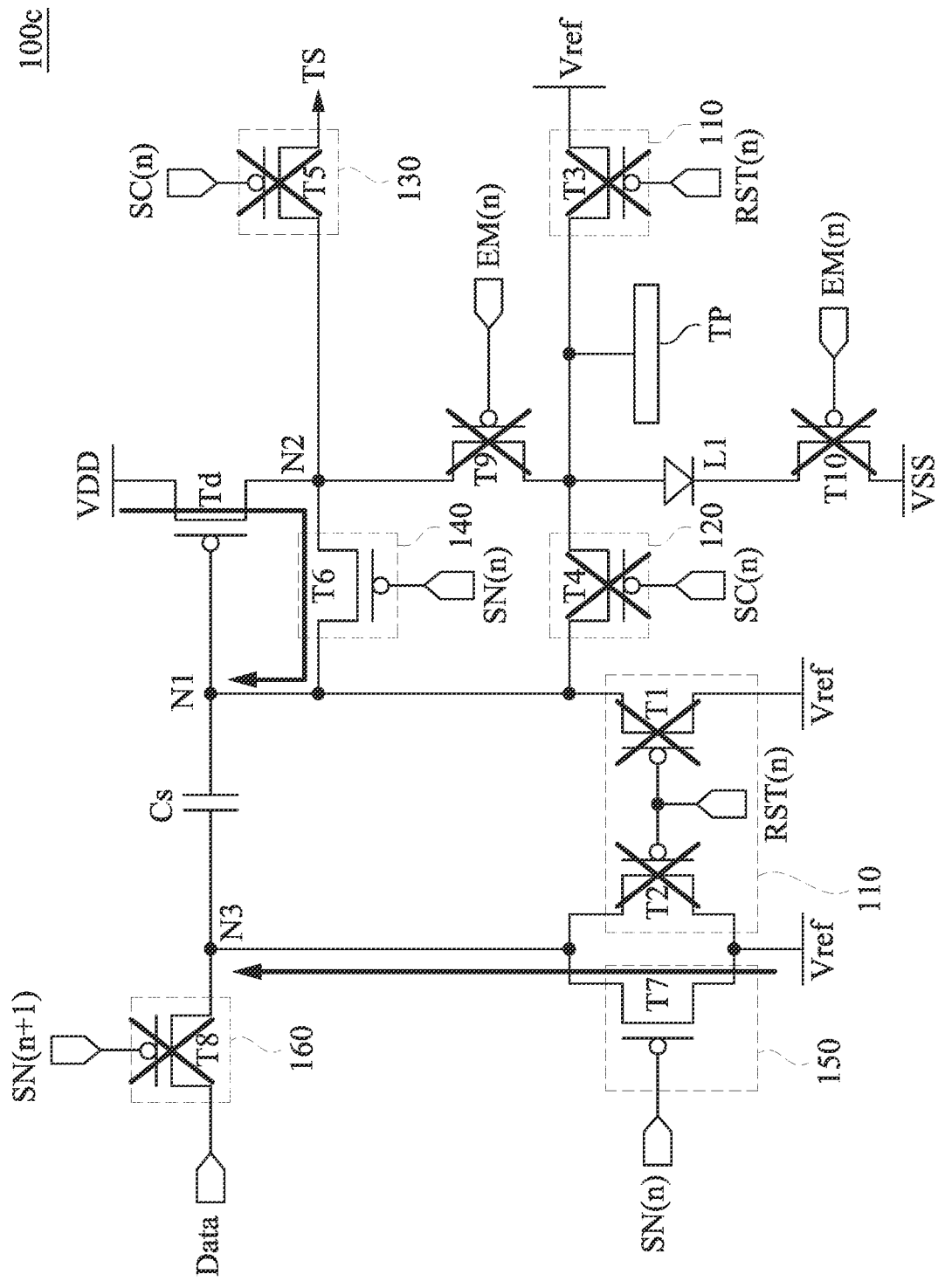
FIG. 7C is a circuit state diagram of the driving circuit in FIG. 6B during the compensation period P4.

Since the timing diagram of the control signal of the driving circuit 100c can also be implemented by FIG. 3, please refer to both FIG. 3 and FIG. 7A to 7E. FIG. 7A is a circuit state diagram of the driving circuit 100c in FIG. 6B during the reset period P1. FIG. 7B is a circuit state diagram of the driving circuit 100c in FIG. 6B during the sensing period P2. FIG. 7C is a circuit state diagram of the driving circuit 100c in FIG. 6B during the compensation period P4.

Figure 7D:
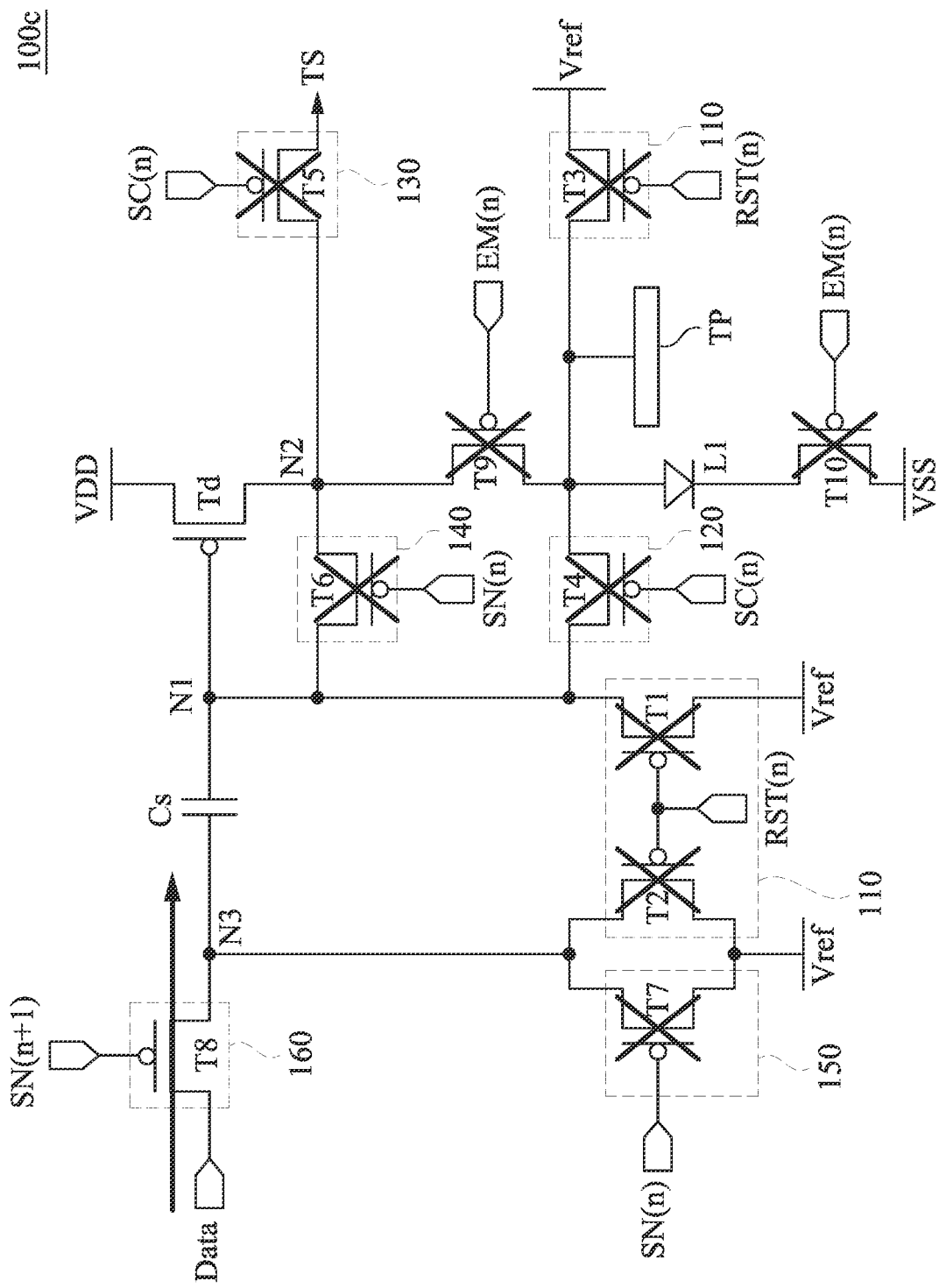
FIG. 7D is a circuit state diagram of the driving circuit in FIG. 6B during the writing period P5.
Figure 7E:
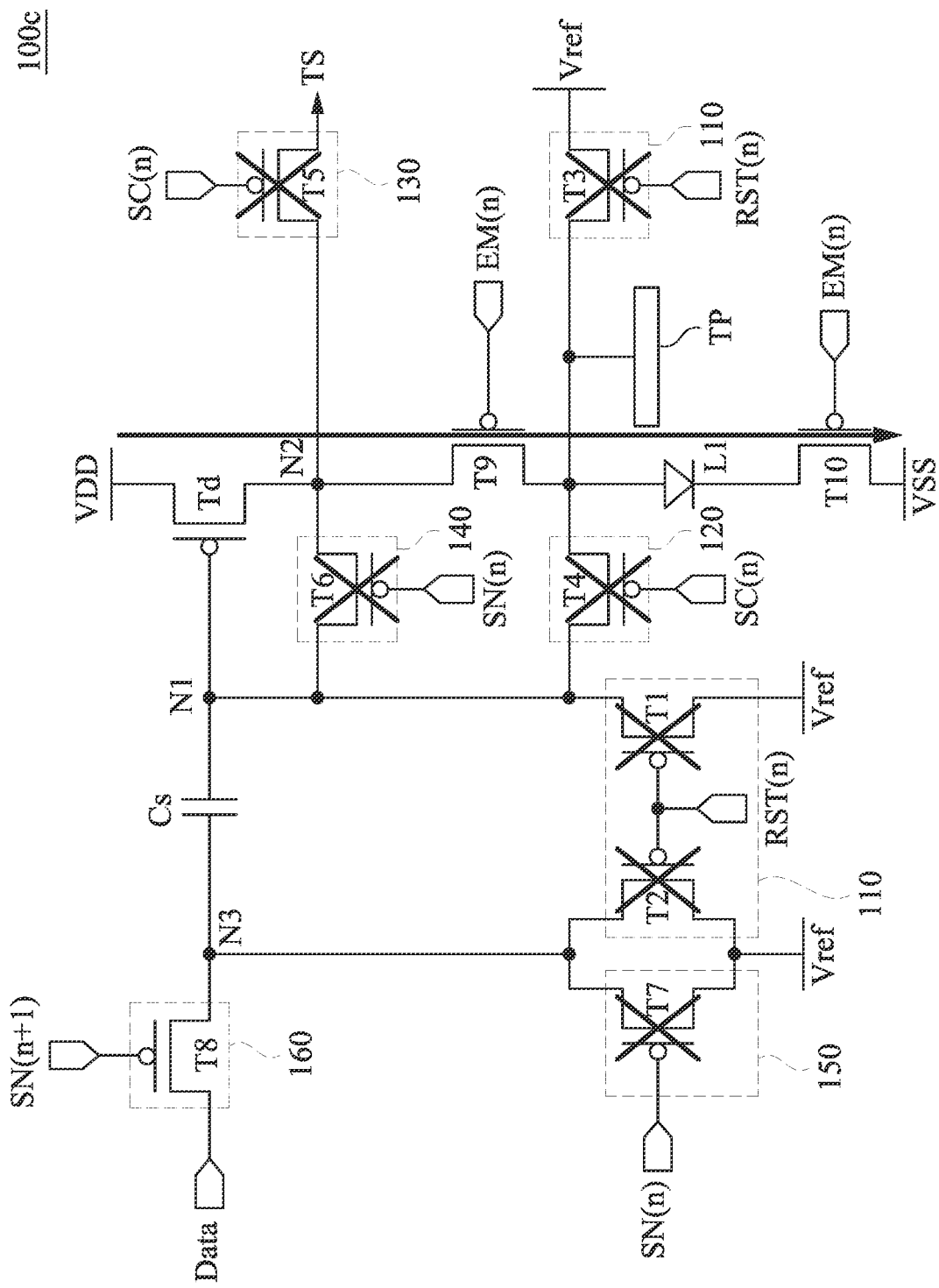
FIG. 7E is a circuit state diagram of the driving circuit in FIG. 6B during the emitting light period P6.

FIG. 7D is a circuit state diagram of the driving circuit 100c in FIG. 6B during the writing period P5. FIG. 7E is a circuit state diagram of the driving circuit 100c in FIG. 6B during the emitting light period P6. As shown in FIG. 3 and FIGS. 7A to 7E, the driving circuit 100c operates in the similar manner to the driving circuit 100c. Therefore, it will not be repeated here.

Figure 8:
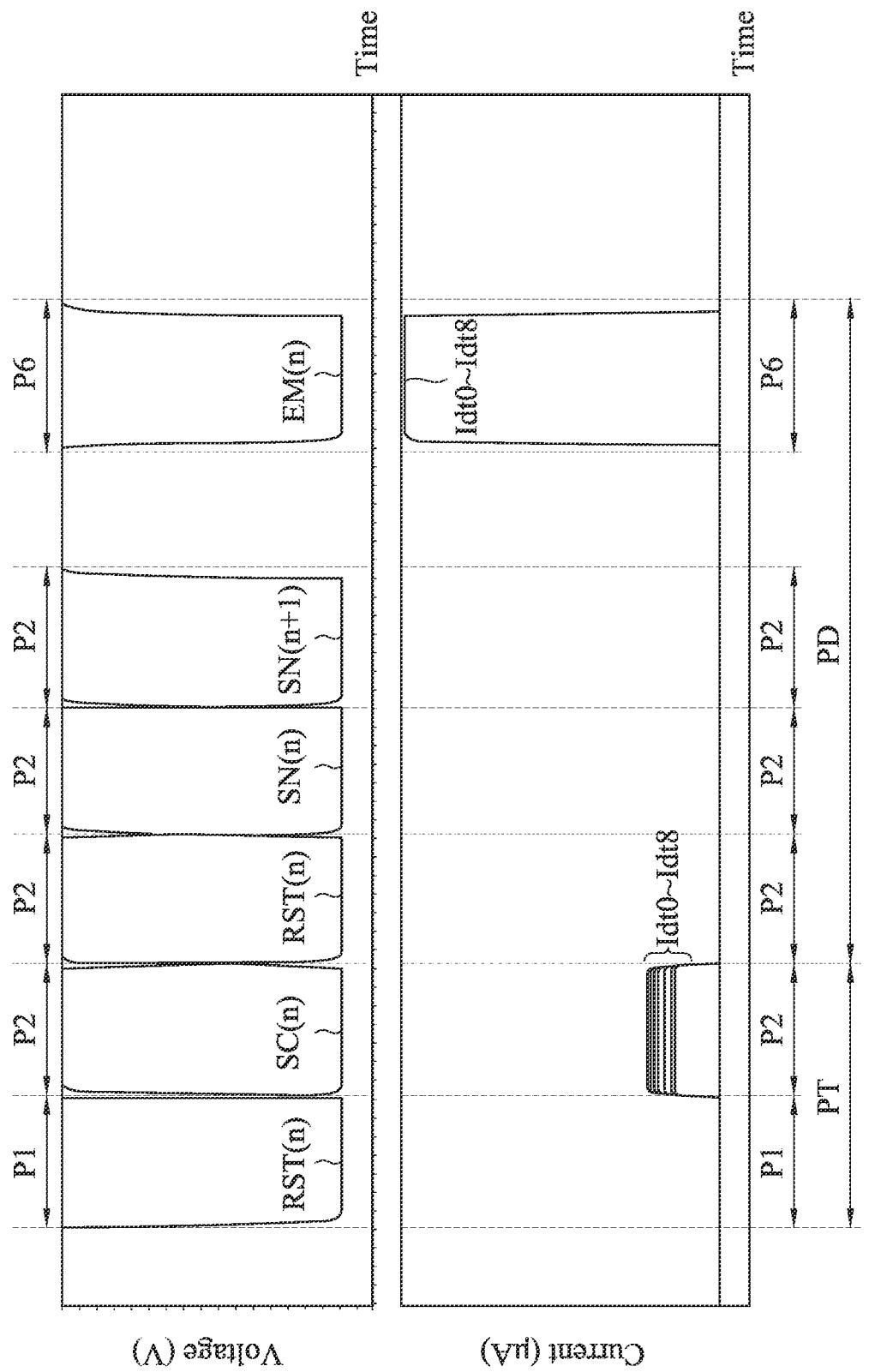
FIG. 8 is a waveform diagram of the control signal of the driving circuit and the current flowing through the driving transistor in FIG. 6B.

Please refer in FIG. 8, FIG. 8 is a waveform diagram of the control signal of the driving circuit 100c and the current flowing through the driving transistor in FIG. 6B and the waveforms of current Id0 to Id8 flowing through the driving transistor Td according to different touch levels. As shown in FIG. 8, the first control signal RST(n) has the low logic during the reset period P1 and P3; the second control signal SC(n) has the low logic during the sensing period P2; the third control signal SN(n) has the low logic level during the compensation period P4; the fourth control signal SN(n+1) has the low logic during the writing period P5; the fifth control signal EM(n) has the low logic during the emitting light period P6.

In some embodiment, during the sensing period P2, depending on the depth of the gap between the user's fingerprints, the capacitance value Cf of the equivalent electrical coupling the touch sensing electrode TP will have different values, and the driving transistor Td will provide different amplitude currents as the touch sensing signal TS. For example, if the user lightly touches the display panel, the large gap between the user's fingerprint and the display panel will cause the capacitance value Cf to be at a smaller value and the driving transistor Td to provide the larger current Id1, 27.1 micro amps, as the touch sensing signal TS. On the other side, if the user touches the display panel more closely, the gap between the user's fingerprints and the display panel is smaller, which will cause the capacitance value Cf to be at the larger value and the driving transistor Td to provide the smaller current Id8, 17.2 micro amps, as the touch sensing signal TS. In the embodiment shown in FIG. 8, the currents Id0 to Id8 are 27.6, 27.1, 26.6, 25.2, 23.4, 21.0, 18.8, 17.8, and 17.2 micro amperes, respectively. Also, the values of currents Id0-Id8 are 118.7 mA during the emitting light period P6. In other words, even if the touch sensing electrode TP is realized by the cathode of the light emitting element L1, the user's touch will not affect the magnitude of the driving current provided to the light emitting element L1 during the emitting light period P6. In this way, during the sensing period P2, the driving circuit 100c can further differentiate between the user's finger and the display panel in terms of how closely it touches.

In summary, the driving circuit 100a, 100b, and 100c of the present disclosure use the touch sensing electrode TP to sense the user's touch, and the sensing circuit 120 transmits the electric potential of the touch sensing electrode TP to the gate terminal of the driving transistor Td, and the read circuit 130 outputs the touch sensing signal TS according to the electric potential of the gate terminal of the driving transistor Td, so that the driving circuit 100a, the 100b, and 100c can integrate the touch sensor function and the pixel driving circuit, and the display time will not be reduced due to the bit resolution and frame rate. Furthermore, the touch sensing electrode TP of the driving circuit 100b can be set at the specific position in the thin film transistor layer 200 to realize the edge-lit light emitting display panel or the back-lit light emitting display panel. On the other side, the touch sensing electrode TP of the driving circuit 100c can be implemented by the cathode electrode of the light emitting element L1, thereby reducing the area of the touch sensor.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A driving circuit, comprising:
    a driving transistor;
    a capacitor, electrically coupled to a gate terminal of the driving transistor;
    a reset circuit, electrically coupled to the gate terminal of the driving transistor, and configured to reset an electric potential of the gate terminal of the driving transistor, wherein the reset circuit comprises a first transistor, a second transistor, and a third transistor, wherein the first transistor is configured to receive a first control signal;
    a touch sensing electrode;
    a sensing circuit, electrically coupled between the touch sensing electrode and the gate terminal of the driving transistor, wherein the sensing circuit comprises:
    a fourth transistor, electrically coupled between the touch sensing electrode and the gate terminal of the driving transistor, with a gate terminal of the fourth transistor configured to receive a second control signal, wherein the fourth transistor is configured to change the electric potential of the gate terminal of the driving transistor according to a ratio of a difference between a high logic level and a low logic level of the second control signal to capacitance value related to the touch sensing electrode; and
    a read circuit, wherein the read circuit is electrically coupled to the driving transistor, and the read circuit is configured to transmit a touch sensing signal according to the electric potential of the gate terminal of the driving transistor.

2. The driving circuit of claim 1, wherein
    a first terminal of the first transistor is electrically coupled to the gate terminal of the driving transistor and a first terminal of the capacitor, wherein a second terminal of the first transistor is electrically coupled to a reference voltage terminal, wherein a gate terminal of the first transistor is configured to receive the first control signal,
    wherein a first terminal of the second transistor is electrically coupled to a second terminal of the capacitor, wherein a second terminal of the second transistor is electrically coupled to the reference voltage terminal, and wherein a gate terminal of the second transistor is configured to receive the first control signal.

3. The driving circuit of claim 2, wherein when the first control signal has a first logic level, the first transistor transmits the electric potential of the reference voltage terminal to the gate terminal of the driving transistor through the first transistor to reset the electric potential of the gate terminal of the driving transistor, and the second transistor is turned on so that the electric potential of the reference voltage terminal is transmitted to the second terminal of the capacitor through the second transistor.

4. The driving circuit of claim 2, wherein the reset circuit is further configured to reset the electric potential of the touch sensing electrode, and wherein
    a first terminal of the third transistor is electrically coupled to the touch sensing electrode, wherein a second terminal of the third transistor is electrically coupled to the gate terminal of the driving transistor, and wherein a gate terminal of the third transistor is configured to receive the first control signal.

5. The driving circuit of claim 2, wherein the reset circuit is further configured to reset the electric potential of the touch sensing electrode, and wherein
    a first terminal of the third transistor is electrically coupled to the reference voltage terminal, a second terminal of the third transistor is electrically coupled to the touch sensing electrode, and a gate terminal of the third transistor is configured to receive the first control signal.

6. The driving circuit of claim 1, wherein
    a first terminal of the fourth transistor is electrically coupled to the touch sensing electrode, wherein a second terminal of the fourth is electrically coupled to the gate terminal of the driving transistor, wherein a gate terminal of the fourth transistor is configured to receive a second control signal, and wherein,
    when the second control signal has a first logic level, the fourth transistor is turned on so that the electric potential of the touch sensing electrode is transmitted to the gate terminal of the driving transistor through the fourth transistor.

7. The driving circuit of claim 1, wherein a first terminal of the driving transistor is electrically coupled to a first system voltage terminal, and a second terminal of the driving transistor is electrically coupled to the read circuit, wherein the read circuit comprises:
    a fifth transistor, wherein a first terminal of the fifth transistor is electrically coupled to the second terminal of the driving transistor, a second terminal of the fifth transistor is configured to output the touch sensing signal, and a gate terminal of the fifth transistor is configured to receive a second control signal;
    wherein when the second control signal has a first logic level, the fifth transistor is turned on, and the fifth transistor outputs the touch sensing signal according to the electric potential of the gate terminal of the driving transistor.

8. The driving circuit of claim 1, further comprising:
    a light emitting element, wherein the driving transistor is configured to drive the light emitting element, and the light emitting element and the driving transistor are electrically coupled between a first system voltage terminal and a second system voltage terminal.

9. The driving circuit of claim 8, wherein a first terminal of the capacitor is electrically coupled to the gate terminal of the driving transistor, and a first terminal of the driving transistor is electrically coupled to the first system voltage terminal, wherein the driving circuit further comprises:
    a compensating circuit, electrically coupled between the gate terminal of the driving transistor and a second terminal of the driving transistor;
    a voltage stabilizing circuit, electrically coupled to a second terminal of the capacitor, and configured to stabilize the electric potential of the second terminal of the capacitor; and
    a writing circuit, electrically coupled to the second terminal of the capacitor, and configured to transmit a data signal to the second terminal of the capacitor.

10. The driving circuit of claim 9, wherein the compensating circuit comprises:
a sixth transistor, wherein a first terminal of the sixth transistor is electrically coupled to the second terminal of the driving transistor, a second terminal of the sixth transistor is electrically coupled to the gate terminal of the driving transistor, and a gate terminal of the sixth transistor is configured to receive a third control signal.

11. The driving circuit of claim 10, wherein the voltage stabilizing circuit comprises:
a seventh transistor, wherein a first terminal of the seventh transistor is electrically coupled to the second terminal of the capacitor, a second terminal of the seventh transistor is electrically coupled to a reference voltage terminal, and a gate terminal of the seventh transistor is configured to receive the third control signal.

12. The driving circuit of claim 11, wherein when the third control signal has a first logic level, the sixth transistor is turned on so that an electric potential of the first system voltage terminal is transmitted to the gate terminal of the driving transistor through the driving transistor and the sixth transistor until the driving transistor is turned off, and the seventh transistor is turned on so that an electric potential of the reference voltage terminal is transmitted to the second terminal of the capacitor through the seventh transistor to stabilize the electric potential of the second terminal of the capacitor.

13. The driving circuit of claim 9, wherein the writing circuit comprises:
an eighth transistor, wherein a first terminal of the eighth transistor is electrically coupled to the second terminal of the capacitor, a second terminal of the eighth transistor is configured to receive the data signal, and a gate terminal of the eighth transistor is configured to receive a fourth control signal;
wherein when the fourth control signal has a first logic level, the eighth transistor is turned on so that the data signal is transmitted to the second terminal of the capacitor through the eighth transistor.

14. The driving circuit of claim 9, further comprising:
a ninth transistor, wherein a first terminal of the ninth transistor is electrically coupled to the second terminal of the driving transistor, a second terminal of the ninth transistor is electrically coupled to a first terminal of the light emitting element, and a gate terminal of the ninth transistor is configured to receive a fifth control signal;
wherein when the fifth control signal has a first logic level, the ninth transistor is turned on so that the light emitting element emits light according to the electric potential of the gate terminal of the driving transistor.

15. The driving circuit of claim 9, further comprising:
a ninth transistor, wherein a first terminal of the ninth transistor is electrically coupled to the second terminal of the driving transistor, a second terminal of the ninth transistor is electrically coupled to a first terminal of the light emitting element, and a gate terminal of the ninth transistor is configured to receive a fifth control signal; and
a tenth transistor, wherein a first terminal of the tenth transistor is electrically coupled to the second terminal of the light emitting element, a second terminal of the tenth transistor is electrically coupled to the second system voltage terminal, and a gate terminal of the tenth transistor is configured to receive the fifth control signal;
wherein when the fifth control signal has a first logic level, the ninth transistor and the tenth transistor are turned on so that the light emitting element emits light according to the electric potential of the gate terminal of the driving transistor.

16. The driving circuit of claim 8, wherein the touch sensing electrode is a cathode electrode of the light emitting element.

17. The driving circuit of claim 1, wherein the touch sensing electrode is adjacent to a basal layer in a thin film transistor layer.

18. The driving circuit of claim 17, wherein a display panel realized by the driving transistor is an edge-lit light emitting display panel or a back-lit light emitting display panel.

* * * * *